United States Patent
Sewak

(10) Patent No.: US 10,963,744 B2
(45) Date of Patent: Mar. 30, 2021

(54) COGNITIVE AUTOMATED AND INTERACTIVE PERSONALIZED FASHION DESIGNING USING COGNITIVE FASHION SCORES AND COGNITIVE ANALYSIS OF FASHION TRENDS AND DATA

(71) Applicant: INTERNATIONAL BUSINESS MACHINES CORPORATION, Armonk, NY (US)

(72) Inventor: Mohit Sewak, Rajendra Nagar (IN)

(73) Assignee: International Business Machines Corporation, Armonk, NY (US)

( * ) Notice: Subject to any disclaimer, the term of this patent is extended or adjusted under 35 U.S.C. 154(b) by 182 days.

(21) Appl. No.: 16/020,205

(22) Filed: Jun. 27, 2018

(65) Prior Publication Data

US 2020/0005087 A1 Jan. 2, 2020

(51) Int. Cl.
| | |
|---|---|
| *G06K 9/62* | (2006.01) |
| *G06F 3/0481* | (2013.01) |
| *G06N 3/04* | (2006.01) |

(52) U.S. Cl.
CPC ......... *G06K 9/6262* (2013.01); *G06F 3/0481* (2013.01); *G06K 9/6218* (2013.01); *G06N 3/04* (2013.01)

(58) Field of Classification Search
None
See application file for complete search history.

(56) References Cited

U.S. PATENT DOCUMENTS

| | | |
|---|---|---|
| 5,749,081 A | 5/1998 | Whiteis |
| 6,266,649 B1 | 7/2001 | Linden et al. |
| 7,007,074 B2 | 2/2006 | Radwin |
| 7,113,917 B2 | 9/2006 | Jacobi et al. |
| 7,617,016 B2 | 11/2009 | Wannier et al. |
| 7,921,061 B2 | 4/2011 | Rangarajan et al. |
| 7,979,877 B2 | 7/2011 | Huber et al. |
| 8,620,707 B1 | 12/2013 | Belyi et al. |
| 8,751,930 B2 | 6/2014 | Jhoney et al. |
| 8,908,962 B2 | 12/2014 | Bhardwaj et al. |

(Continued)

FOREIGN PATENT DOCUMENTS

| | | |
|---|---|---|
| CN | 104281890 A | 1/2015 |
| CN | 110363213 A | 10/2019 |

(Continued)

OTHER PUBLICATIONS

Liu Z, Luo P, Qiu S, et al. Deepfashion: Powering robust clothes recognition and retrieval with rich annotations[C]//Proceedings of the IEEE Conference on Computer Vision and Pattern Recognition. 2016: 1096-1104. (Year: 2016).*

(Continued)

*Primary Examiner* — Andrae S Allison
(74) *Attorney, Agent, or Firm* — Reza Sarbakhsh

(57) ABSTRACT

Approaches for automated fashion designing are described. A computer-implemented method for automated fashion designing includes: training, by a computer device, computer models using deep learning based computer vision; identifying, by the computer device, at least one gap using cognitively determined fashionability scores (F-scores); and creating, by the computer device, a new fashion design using the computer models and the at least one identified gap.

19 Claims, 8 Drawing Sheets

(56) References Cited

U.S. PATENT DOCUMENTS

| | | | |
|---|---|---|---|
| 9,135,491 | B2 | 9/2015 | Morandi et al. |
| 9,141,886 | B2 | 9/2015 | Auclair et al. |
| 9,661,886 | B1 | 5/2017 | Selvarman |
| 9,785,898 | B2 | 10/2017 | Hofman et al. |
| 10,062,039 | B1* | 8/2018 | Lockett .................. G06N 20/00 |
| 10,540,575 | B1* | 1/2020 | Brody .................. G06K 9/6267 |
| 10,776,417 | B1 | 9/2020 | Ravichandran |
| 2006/0277098 | A1 | 12/2006 | Chung et al. |
| 2007/0150801 | A1* | 6/2007 | Chidlovskii ......... G06K 9/6254 715/210 |
| 2007/0244842 | A1 | 10/2007 | Ishii et al. |
| 2008/0228749 | A1* | 9/2008 | Brown ................ G06F 16/7844 |
| 2008/0262917 | A1 | 10/2008 | Green et al. |
| 2008/0306819 | A1 | 12/2008 | Berkhin et al. |
| 2008/0307052 | A1 | 12/2008 | Krishnan et al. |
| 2009/0006156 | A1 | 1/2009 | Hunt et al. |
| 2009/0276291 | A1 | 11/2009 | Wannier et al. |
| 2011/0011936 | A1 | 1/2011 | Morandi et al. |
| 2011/0103682 | A1* | 5/2011 | Chidlovskii ......... G06K 9/6284 382/159 |
| 2012/0123978 | A1* | 5/2012 | Toderice ............ G06K 9/00744 706/12 |
| 2012/0323620 | A1 | 12/2012 | Hofman et al. |
| 2013/0066742 | A1 | 3/2013 | Stevens et al. |
| 2014/0003729 | A1 | 1/2014 | Auclair et al. |
| 2014/0039979 | A1 | 2/2014 | Zhang et al. |
| 2014/0379426 | A1 | 12/2014 | Guo et al. |
| 2015/0046223 | A1 | 2/2015 | Sewak |
| 2015/0058079 | A1 | 2/2015 | Freund et al. |
| 2015/0139485 | A1 | 5/2015 | Bourdev |
| 2015/0254675 | A1 | 9/2015 | Kannan et al. |
| 2015/0324828 | A1 | 11/2015 | Ouimet |
| 2015/0332296 | A1 | 11/2015 | Chu et al. |
| 2015/0339726 | A1 | 11/2015 | Herring et al. |
| 2015/0347933 | A1 | 12/2015 | Sewak |
| 2016/0085889 | A1 | 3/2016 | Sewak |
| 2016/0110794 | A1 | 4/2016 | Hsiao et al. |
| 2016/0125503 | A1 | 5/2016 | Li et al. |
| 2016/0148150 | A1 | 5/2016 | Curtat et al. |
| 2016/0189011 | A1 | 6/2016 | Bhardwaj et al. |
| 2016/0189274 | A1 | 6/2016 | MacLaurin et al. |
| 2016/0225053 | A1 | 8/2016 | Romley et al. |
| 2016/0371261 | A1* | 12/2016 | Cormack ................ G06F 16/93 |
| 2017/0004567 | A1 | 1/2017 | Dutt et al. |
| 2017/0098187 | A1 | 4/2017 | Jung et al. |
| 2017/0178061 | A1 | 6/2017 | Griffin et al. |
| 2018/0005035 | A1 | 1/2018 | Bogolea et al. |
| 2018/0005106 | A1 | 1/2018 | Hachiya |
| 2018/0114114 | A1 | 4/2018 | Molchanov et al. |
| 2018/0189725 | A1 | 7/2018 | Mattingly et al. |
| 2018/0218436 | A1 | 8/2018 | Cooper |
| 2018/0349477 | A1 | 12/2018 | Jaech et al. |
| 2019/0026609 | A1 | 1/2019 | Shen |
| 2019/0043003 | A1 | 2/2019 | Fisher et al. |
| 2019/0220694 | A1 | 7/2019 | Biswas et al. |
| 2019/0251446 | A1* | 8/2019 | Fang ...................... G06F 16/51 |
| 2019/0278426 | A1 | 9/2019 | He et al. |
| 2019/0318209 | A1 | 10/2019 | Sewak et al. |
| 2019/0318210 | A1 | 10/2019 | Sewak et al. |
| 2019/0318299 | A1 | 10/2019 | Sewak |
| 2019/0318304 | A1 | 10/2019 | Sewak |
| 2019/0355008 | A1 | 11/2019 | Sewak |
| 2019/0355041 | A1 | 11/2019 | Sewak et al. |
| 2019/0370874 | A1 | 12/2019 | Brooks et al. |
| 2020/0034781 | A1 | 1/2020 | Sewak et al. |

FOREIGN PATENT DOCUMENTS

| | | |
|---|---|---|
| CN | 110728015 A | 1/2020 |
| JP | 2004508604 A | 3/2004 |
| WO | 2010141637 A1 | 12/2010 |
| WO | 2015127394 A1 | 8/2015 |
| WO | 2016098973 A1 | 6/2016 |

OTHER PUBLICATIONS

He, Tong, and Yang Hu. "FashionNet: Personalized Outfit Recommendation with Deep Neural Network." arXiv preprint arXiv: 1810.02443 (2018). (Year: 2018).*

Shah et al, Fashion Outfit Composition by Deep Learning Approach, International Research Journal of Engineering and Technology (IRJET), vol. 05 Issue: 06 | Jun. 2018 (Year: 2018).*

Tuinhof, Hessel, Clemens Pirker, and Markus Haltmeier. "Image-based fashion product recommendation with deep learning." International Conference on Machine Learning, Optimization, and Data Science. Springer, Cham, 2018. (Year: 2018).*

Li, Yuncheng, et al. "Mining fashion outfit composition using an end-to-end deep learning approach on set data." IEEE Transactions on Multimedia 19.8 (2017): 1946-1955. (Year: 2017).*

Huang, Ying, and Tao Huang. "Outfit Recommendation System Based on Deep Learning." 2nd International Conference on Computer Engineering, Information Science & Application Technology (ICCIA 2017). Atlantis Press, 2016. (Year: 2017).*

Jaradat, Shatha. "Deep cross-domain fashion recommendation." Proceedings of the Eleventh ACM Conference on Recommender Systems. 2017. (Year: 2017).*

Nguyen, Hai Thanh, et al. "Learning to rank for personalised fashion recommender systems via implicit feedback." Mining Intelligence and Knowledge Exploration. Springer, Cham, 2014. 51-61. (Year: 2014).*

Sewak et al., "Practical Convolutional Neural Networks", Implement Advanced Deep Learning Models Using Python, Chapter 2, Feb. 2018, pp. 26-40.

Sewak et al., "Practical Convolutional Neural Networks", Implement Advanced Deep Learning Models Using Python, Chapter 4, Feb. 2018, pp. 92-102.

Sewak et al., "Practical Convolutional Neural Networks", Implement Advanced Deep Learning Models Using Python, Chapter 5, Feb. 2018, pp. 104-113.

Phillips et al., "Narrative and Persuasion in Fashion Advertising", Journal of Consumer Research, vol. 37, Issue 3, Oct. 1, 2010, pp. 368-392, Abstract provided.

Davis et al., "Apparel Advertising Appeals as a Function of Apparel Classification: Trendy Versus Classic," Perceptual and Motor Skills, 1989, 68, pp. 1011-1014.

Lennon et al., "Evaluations of Apparel Advertising as a Function of Self-Monitoring", Preceptual and Motor Skills, 1988, 66, pp. 987-996.

Ingram, "Ideas for Advertising Clothes", Chron.com, http://smallbusiness.chron.com/ideas-advertising-clothes-10375.html, downloaded May 1, 2018, pp. 1-5.

LeChat, "Promotional Strategies for a Clothing Store", Chron.com, http://smallbusiness.chron.com/promotional-strategies-clothing-store-13851.html, downloaded May 1, 2018, pp. 1-4.

West, "Fashion Marketing Techniques", Chron.com, http:/smallbusiness.chron.com/fashion-marketingtechniques-65320.html, downloaded May 1, 2018, pp. 1-4.

Reynolds, "Creative Marketing Strategies for the Fashion Industry", Chron.com, http:/smallbusiness.chron.com/creative-marketing-strategies-fashion-industry-67393.html, downloaded May 1, 2018, pp. 1-5.

Masaki, "How to Advertise and Market Your Clothing Line", Clothing Line—Advertising and Marketing Tips and Tricks by HTSACC, https://www.howtostartacloghingcompany.com/advertise-market-clothing-line/ downloaded May 1, 2018, pp. 1-13.

Author Unknown, "20 Product Priorization Techniques: A Map and Guided Tour", Folding Burritos (https://foldingburritos.com/product-prioritization-techniques/, downloaded May 1, 2018, pp. 1-30.

Witcher et al., "The Forester Wave™: Omnichannel Order Management, Q3 2016", The Nine OMS Providers That Matter Most for Omnichannel Retail and How They Stack up, for Ebusiness & Channel Strategy Professionals., Forrester.com, Jul. 12, 2016, 20 pages.

Walker, "Inventory Management With Machine Learning—3 Use Cases in Industry", Techemergence, https://www.techemergence.com, Feb. 20, 2018, 10 pages.

(56) References Cited

OTHER PUBLICATIONS

Knight, "Inside Amazon's Warehouse, Human-Robot Symbiosis," Intelligent Machines, Jul. 7, 2015, pp. 1-8.
Canitz, "Machine Learning in Supply Chain Planning," Logility Planning Optimized, Oct. 4, 2016, pp. 1-2.
Author Unknown, "Coca-Cola Leverages AI for Inventory Management," Technology News, Supply Chain 24/7 Article, Mar. 28, 2017, pp. 1-11.
Pending U.S. Appl. No. 16/132,867, filed Sep. 17, 2018, entitled: "System and Method for Cognitive and Preemptive Fashion Inventory Management & Order Fulfilment", 53 pages.
Conlon,"The Vogue Glossary", http://www.vogue.co.uk/gallery/the-vogue-glossary, Oct. 17, 2013, 63 pages.
Alves, "Predicting Product Sales in Fashion Retailing: A Data Analytics Approach", Jul. 23, 2017, 59 pages.
Spolini, "Cognitive Computing supports fashion designer", http://www.vogue.it/en/vogue-talents/news/2017/03/29/watson-ibm-jason-grech-marchesa-the-north-face/, Mar. 29, 2017, 4 pages.
McClellan, "Cognitive Marchesa dress lights up the night", https://www.ibm.com/blogs/internet-of-things/cognitive-marchesa-dress/, Oct. 27, 2016, 3 pages.
Rubin, "Weaving Cognitive into Couture: Watson and Marchesa Collaborate for the Met Gala", https://www.ibm.com/blogs/think/2016/04/watson-and-marchesa/, Apr. 29, 2016, 4 pages.
Mastroianni, "Marchesa, IBM Watson design "cognitive dress" for Met Gala", http://www.cbsnews_com/news/marchesa-ibm-watson-to-debut-cognitive-dress-at-mondays-met-gala/, May 2, 2016, 4 pages.
Fashion Dictionary, http://wwd.com/fashion-dictionary/, Accessed Jun. 25, 2018, 22 pages.
Ralph et al., "A Framework for Automatic Online Personalization", Proceedings of the 39th Hawaii International Conference on System Sciences—2006, Downloaded on Nov. 6, 2020, 10 pages.

\* cited by examiner

COGNITIVE AUTOMATED AND INTERACTIVE PERSONALIZED FASHION DESIGNING USING COGNITIVE FASHION SCORES AND COGNITIVE ANALYSIS OF FASHION TRENDS AND DATA

BACKGROUND

The present invention relates generally to automating fashion designing and, more specifically, to using image analytics and cognitive analysis to create new fashion designs in an automated manner that permits user interaction and iteration.

There are typically three parties in fashion design and fashion commerce: fashion designers, fashion retailers (also called merchandisers), and fashion customers. The conventional business model is for fashion designers to create fashion designs that are embodied as fashion products (e.g., clothing). A fashion retailer opts to sell certain ones of the available fashion products (i.e., a subset of all the available fashion designs). Fashion customers may purchase the fashion products that are offered for sale by the fashion retailers.

Attempts to integrate cognitive analysis with fashion design have been directed to the first of these parties, i.e., the fashion designers. In one example, a designer generated mixed fashion and architecture images using cognitive analysis of a combination of (i) images of fashion products and (ii) images of buildings to, and then used the generated mixed images as inspiration in manually designing new fashion products. In another example, a designer created a garment that is illuminated and changes color based on cognitive analysis of the wearer's social media data.

SUMMARY

In an aspect of the invention, there is a computer-implemented method for automated fashion designing. The method includes: training, by a computer device, computer models using deep learning based computer vision; identifying, by the computer device, at least one gap using cognitively determined fashionability scores (F-scores); and creating, by the computer device, a new fashion design using the computer models and the at least one identified gap.

In another aspect of the invention, there is a computer program product for automated fashion designing. The computer program product includes a computer readable storage medium having program instructions embodied therewith. The program instructions are executable by a host computing device to cause the host computing device to: train computer models using deep learning based computer vision; identify a group of components to use in fashion design using cognitively determined fashionability scores (F-scores); and create a new fashion design using the trained computer models and the identified group of components.

In another aspect of the invention, there is a system for automated fashion designing. The system includes a processor, a computer readable memory and a computer readable storage medium associated with a computing device; program instructions to train computer models using deep learning based computer vision; program instructions to identify a group of components to use in fashion design using cognitively determined fashionability scores (F-scores); and program instructions to create a new fashion design using the trained computer models and the identified group of components. The program instructions are stored on the computer readable storage medium for execution by the processor via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
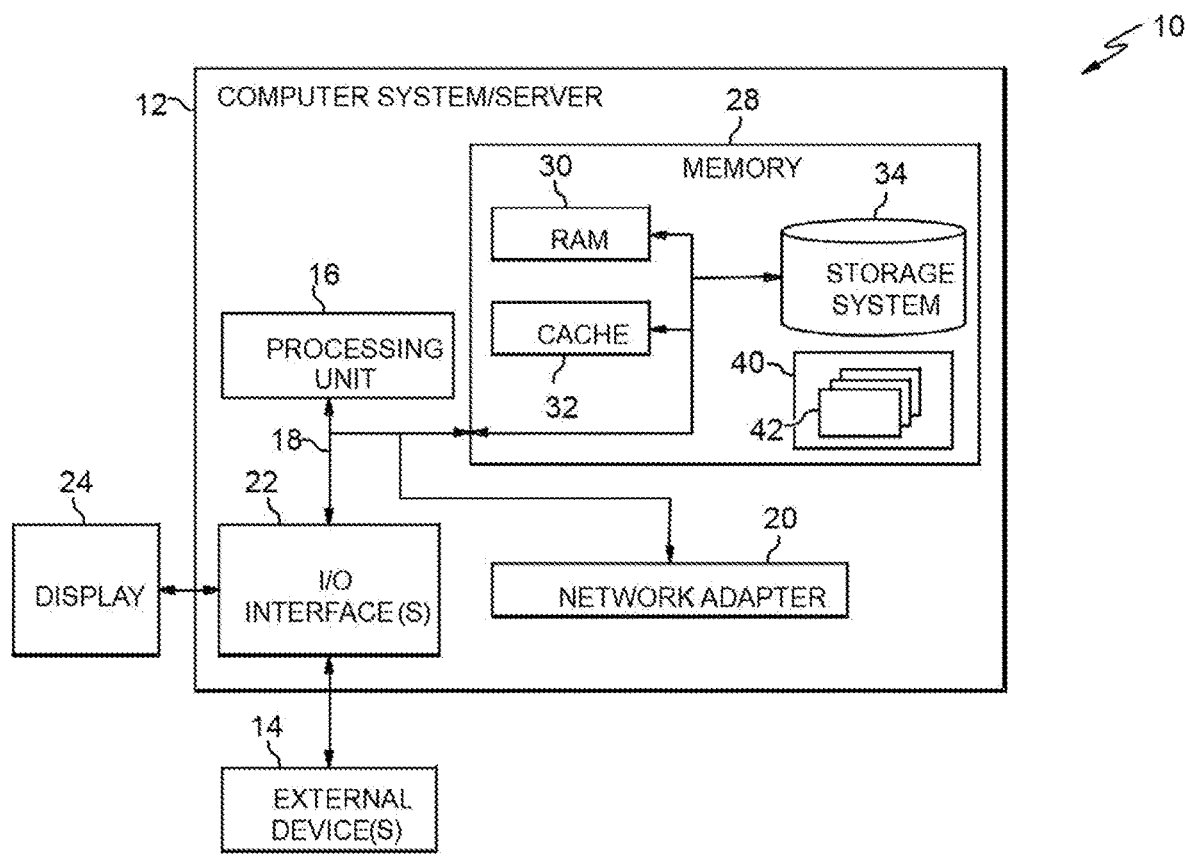
FIG. 1 depicts a computing infrastructure according to an embodiment of the present invention.

The present invention relates generally to automating fashion designing and, more specifically, to using image analytics and cognitive analysis to create new fashion designs in an automated manner that permits user interaction and iteration. Aspects of the present invention are directed to using image analytics and cognitive analysis to form new fashion designs based on extracting, transforming, and combining different components of existing fashion designs. In embodiments, cognitive analysis and deep learning based computer vision are used to create new fashion designs from different images of existing fashion designs and based on an F-score (i.e., a fashionability score). The new fashion designs may be created in this manner using either an automated approach or an interactive and iterative approach that leverages user feedback. In the interactive and iterative approach, the system may receive user input of which components they like and dislike from different images of fashion designs, and the system may generate a new fashion design based on this user input. In embodiments, the system may present the generated new fashion design to the user, receive user input regarding likes and dislikes of one or more components of the new fashion design, and generate another new fashion design based on the previously generated new fashion design and the user input. In this manner, the system may provide an interactive and iterative approach for creating new fashion designs for a particular user.

As used herein, a fashion design refers to a visual representation of a fashion product, such as a piece of clothing, such as a shirt, blouse, dress, gown, pant, hat, glove, shoe, etc. In embodiments, the system creates new fashion designs using trained computer models that leverage deep learning based computer vision. In particular, the system may train and utilize models that employ object detection and instance segmentation to identify and categorize all the fashion glossary concepts (e.g., components) included in an image of an existing fashion design. Moreover, the system may train and utilize the models to create a new fashion design by stitching together and homogenizing different ones of the identified and categorized fashion glossary concepts (e.g., components). In this manner, implementations of the invention may be used to automatically generate new fashion designs based on image analytics of existing fashion designs and cognitive analysis of fashion trends and data.

As described herein, aspects of the invention employ deep learning based computer vision to perform image classification, object detection, instance segmentation, and transfer learning of images of existing fashion designs. In embodiments, the deep learning is machine learning that utilizes conventional or later developed neural networks techniques. Examples of techniques that may be used in embodiments include but are not limited to: Convolutional Neural Networks (CNN), Region-based Convolutional Neural Networks (R-CNN), Fast R-CNN, Faster R-CNN, Mask R-CNN, Haar Cascades, and Local Binary Pattern (LBP) Cascades. In this manner, implementations of the invention may be configured to utilize deep learning based computer vision to analyze images of existing fashion designs, and to generate new fashion designs based in part on this analysis.

As described herein, the F-score is a fashionability score of a product (i.e., a particular fashion design) within a category and subcategory of fashion products. In embodiments, the F-score is determined using cognitive analysis of fashion trends and associated fashion data including but not limited to social media, eCommerce data, and omni-channel retail data. For example, the F-score may be determined based in part on cognitive analysis of positive and negative data (e.g., likes and dislikes, positive and negative critiques or reviews, advertisements, etc.) associated with a fashion design as a whole or individual attributes of a fashion design, as obtained from sources such as social media, online fashion magazines, online retailers, etc. In embodiments, the F-score is a number with a dimension that can be used in downstream machine learning algorithms requiring numerical data as inputs. The dimension may represent the trendiness of the product at a given moment in time, for example, and the number may represent a relative measure of the trendiness that can be compared to other F-scores for different products.

In embodiments, the F-score is used to determine gaps that can be filled with new fashion designs. As used herein, a gap refers to a quantifiable difference between the fashion products that a fashion retailer offers and the fashion products that a fashion customer wants. By using the F-score to identify gaps, implementations of the invention may be used to automatically generate new fashion designs to fill the gaps and thus provide a benefit to both the fashion retailer and the fashion customer.

As already noted herein, there are typically three parties in fashion design and fashion commerce: fashion designers, fashion retailers (also called merchandisers), and fashion customers. This arrangement suffers from the problem that the fashion customer has no input in the fashion design process, and must settle for whatever fashion products are available via the fashion retailers. Aspects of the invention provide a solution to this problem by creating fashion designs that are personalized to fashion customers. In particular, in contrast to integrating cognitive analysis techniques from the perspective of the fashion designer, aspects of the invention apply cognitive analysis techniques to determine fashion design demands of fashion retailers and fashion customers. From the fashion customer point of view, aspects of the invention may be used to create personalized fashion designs for a particular customer. From the fashion retailer point of view, aspects of the invention may be used to identify gaps between what the fashion retailer offers and what fashion customers want, and to create new fashion designs to fill the identified gaps. In embodiments, such new fashion designs may capture current trends using the F-score as described herein. In additional embodiments, the system may optimize the new fashion designs that fill the identified gaps based in part on predicted profitability of the new designs and how the new designs affect other fashion products.

According to aspects of the invention, there is a system and method that cognitively and interactively designs targeted clothing (e.g., fashion designs) based on a cognitive fashionability score (F-Score) and targeted price of a required product for any given fashion sub-category. Embodiments include a mechanism to predict the likely sales of such a designed fashion product, the interaction effects of the same on existing products in the subcategory and within a particular F-Score range, and the optimal design components that should be part of the product. Implementations are configured to use the F-Score, which ensures that the designed products are not just to the liking of a particular designer, but also that different designs can be obtained for different types of consumer groups with different fashion liking. Implementations also have the capability to present the whole product prototype image based on the identified sub-components, and to can interactively change one or more components with one identified by the algorithm based on criteria to preserve the targeted aspects on which the design was originally created.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 1, a schematic of an example of a computer infrastructure is shown. Computer infrastructure 10 is only one example of a suitable computer infrastructure and is not intended to suggest any limitation as to the scope of use or functionality of embodiments of the invention described herein. Regardless, computer infrastructure 10 is capable of being implemented and/or performing any of the functionality set forth hereinabove.

In computer infrastructure 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computer infrastructure 10 is shown in the form of a general-purpose computing device. The components of computer system 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
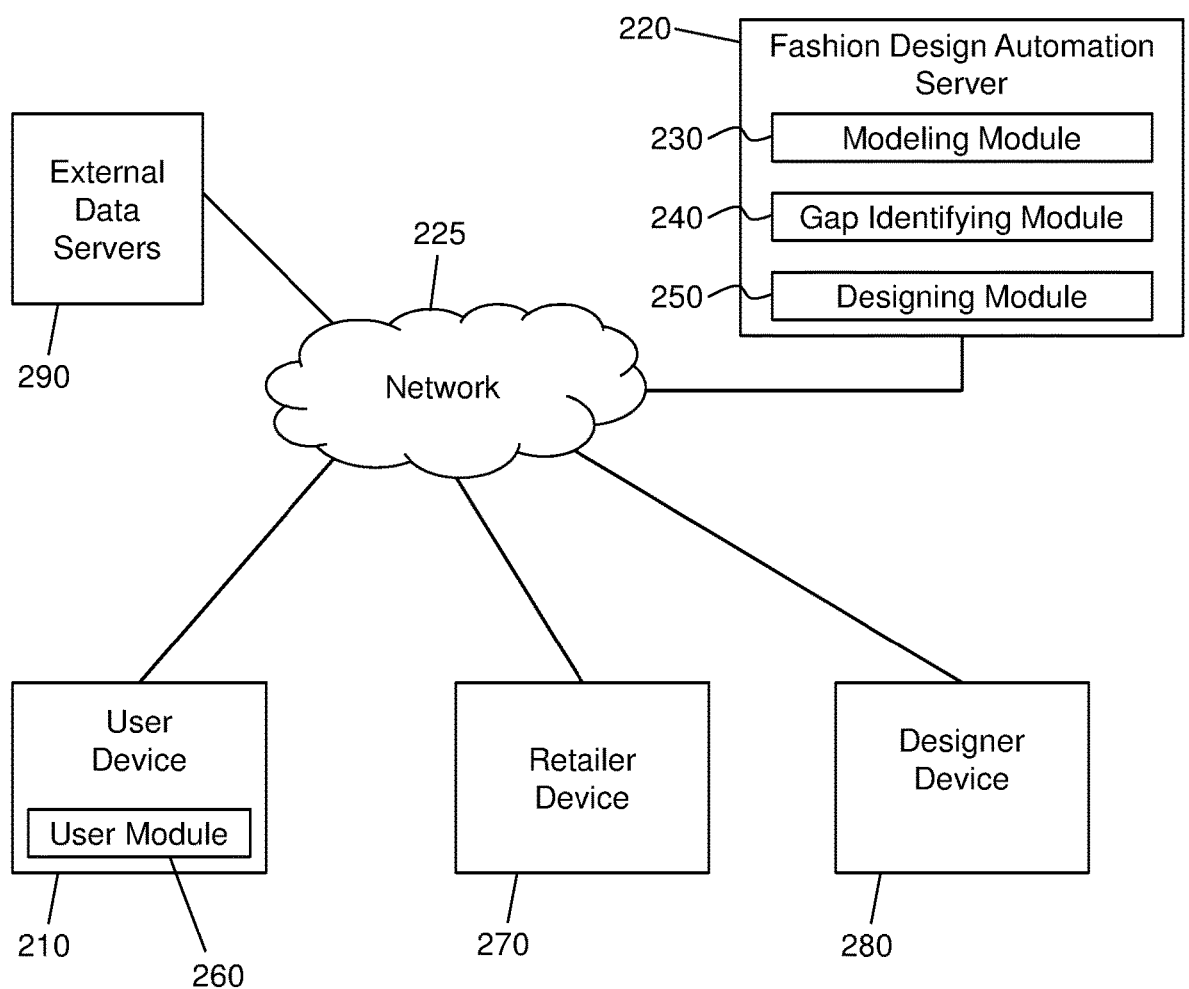
FIG. 2 shows an exemplary environment in accordance with aspects of the invention.

FIG. 2 shows a block diagram of an exemplary environment in accordance with aspects of the invention. In embodiments, the environment includes a user device 210 operatively connected to a fashion design automation server 220 via a network 225. The environment may include plural user devices 210 associated with plural different end users of the system, such that each different user may interact with the system independently of the other users. Each user device 210 may comprise a computer device, such as a laptop computer, tablet computer, desktop computer, etc., that includes one or more elements of computer system 12 of FIG. 1.

The network 225 may comprise any suitable computer network or combination of networks. For example, the network 225 may comprise one or more of a LAN, WAN, and the Internet. In an exemplary implementation, the environment shown in FIG. 2 is a cloud computing environment and the devices shown in FIG. 2 are nodes within the cloud computing environment. In the cloud implementation, the fashion design automation server 220 may provide services described herein to the devices in a Software-as-a-Service (SaaS) cloud model.

The fashion design automation server 220 may comprise a computer device, such as a server, that includes one or more elements of computer system 12 of FIG. 1. In embodiments, the fashion design automation server 220 includes a modeling module 230, a gap identifying module 240, and a designing module 250, each of which may comprise one or more program modules 42 described with respect to FIG. 1.

In embodiments, the modeling module 230 is configured to use a corpus of fashion image data to create and/or train models that employ deep learning based computer vision to perform image classification, object detection, instance segmentation, and transfer learning of images of existing fashion designs. Training the models is described in greater detail with respect to step 305 of FIG. 3 and the steps shown in FIG. 4A. The models, once trained, may be used by the designing module 250 to generate new fashion designs in an automated manner, as described herein.

In embodiments, the gap identifying module 240 is configured to identify gaps between fashion designs that a fashion retailer offers and fashion designs that are desired by a fashioner customer (e.g., a user associated with user device 210). In embodiments, the gap identifying module 240 determines gaps based on data that is used to quantitatively define fashionability and price aspects of different fashion designs. This may be based, at least in part, on determining F-scores for fashion designs using cognitive analysis as described herein. The data may be obtained from one or more external data servers 290, as described herein. Determining an F-score is described in greater detail at FIGS. 5 and 6. Identifying the gaps is described in greater detail with respect to step 310 of FIG. 3 and the steps shown in FIG. 4B. The gaps, once identified, may be used by the designing module 250 to generate new fashion designs in an automated manner, as described herein.

In embodiments, the designing module 250 is configured to use the trained models (from the modeling module 230) with data defining the gaps (from the gap identifying module 240) to generate a new fashion design in an automated manner. As used herein, generating a new fashion design refers to computer-based generation of a visual representation (e.g., an electronic image) of a fashion product (e.g., a piece of clothing). Generating the new fashion design is described in greater detail with respect to step 315 of FIG. 3 and the steps shown in FIG. 4C. The fashion design, once generated, may be visually presented to a user, as described herein. In some embodiments, the designing module 250 is configured to receive feedback from a user (via the user device 210) and to automatically revise the new fashion design based on the user feedback.

In embodiments, the user device 210 includes a user module 260 that is configured to provide a user interface for the user to access the functions provided by the fashion design automation server 220. The user module 260 may comprise one or more program modules 42 described with respect to FIG. 1. For example, the user module 260 may comprise a mobile application or a web-based portal that is configured to: receive data from the fashion design automation server 220, the data defining a fashion design generated in an automated manner by the fashion design automation server 220; visually display the fashion design on a display the user device 210; receive user input comprising positive or negative feedback about one or more components of the displayed fashion design; communicate the user input to the fashion design automation server 220; receive data from the fashion design automation server 220, the data defining a new fashion design generated in an automated manner by the fashion design automation server 220 based on the user feedback; and visually display the new fashion design on a display the user device 210. In this manner, the user device 210 and the user module 260 may be used to provide the user with an interactive and iterative system for interfacing with the fashion design automation server 220 to produce a new fashion design that is personalized to the user based on the user's input.

With continued reference to FIG. 2, the environment may include one or more merchandiser computer devices 270 and one or more designer computer devices 280 associated with one or more fashion retailers and one or more fashion designers, respectively. Each of the merchandiser computer devices 270 and the designer computer devices 280 may comprise, for example, a laptop computer, tablet computer, desktop computer, etc., that includes one or more elements of computer system 12 of FIG. 1.

Still referring to FIG. 2, the environment may include one or more external data servers 290. The external data servers 290 may include one or more computing devices (e.g., such as computer system/server 12 of FIG. 1) that store fashion related data. The external data servers 290 may be fashion sources, such as social media sources, print media related to fashion, electronic media related to fashion, etc. In embodiments, the fashion design automation server 220 may automatically retrieve and monitor fashion data from the one or more external data servers 290. As described herein, "fashion data" may include images, videos, text articles/comments, sales data for fashion products, customer satisfaction information for fashion products, and/or other data that relates to fashion trends and/or fashion products. In embodiments, the fashion design automation server 220 may parse data received from the external data servers 290 to determine which data is fashion related data, and filter out non-fashion related data. For example, the fashion design automation server 220 may use image analysis techniques to identify fashion products, social media filtering techniques to identify images, comments, articles, etc. related to fashion products (e.g., by subject matter category filtering techniques, hashtag filtering, etc.), natural language processing (NLP) techniques to determine articles and/or other text that relates to fashion products, etc.

As fashion data is obtained from the external data servers 290, the gap identifying module 240 of the fashion design automation server 220 may process the fashion data with cognitive fashion identification and recognition to identify fashion products, attributes of the fashion products (types, materials, styles, design patterns, colors, etc.), identify new fashion trends, and generate F-scores for fashion products over multiple domains based on fashion data (e.g., based on the attributes of the products, consumer and/or critic comments regarding the fashion products, sales data, merchant preferences, user preferences, etc.).

In embodiments, F-scores may be generated for each portion of a fashion product (e.g., a fashion score for the torso section of a shirt, and another score for the sleeves of the shirt, etc.). As an example, the F-scores may be based on customer and/or critic comments that indicate that certain color/pattern combinations are more desirable than others. Thus, if the torso and sleeve sections have undesirable color/pattern/style combinations (e.g., as determined based on natural language processing of customer and/or critic comments), the F-scores may be relatively low. Fashion scores may be generated for different domains (e.g., dimensions) for a single product. For example, a shirt may have a score that indicates a measure of consumer value (e.g., a first dimension), another score that indicates a measure of consumer popularity (e.g., a second dimension), another score that indicates a measure of how closely the object conforms to a particular style or type (e.g., a third dimension), another score that indicates a measure of trendiness (e.g., a fourth dimension), and another score that indicates a profit level (e.g., a fifth dimension). That is, a shirt may have a modern style score, a vintage style score, an "evening dress" type score indicating the level to which the product conforms to the evening dress type, a trendiness score, a profit score, a cost score, etc. Further, individual sections or sub-classifications of the shirt may have individual fashion scores for each domain. Also, an entire ensemble may have an F-score based on an interaction effect of how well different fashion products mix together. Further, as more fashion data is continuously received, fashion product inventories and F-scores are updated. In this way, the fashion design automation server 220 uses cognitive analysis to recognize and analyze new fashion trends, and update/maintain data relating to the fashion trends.

Figure 3:
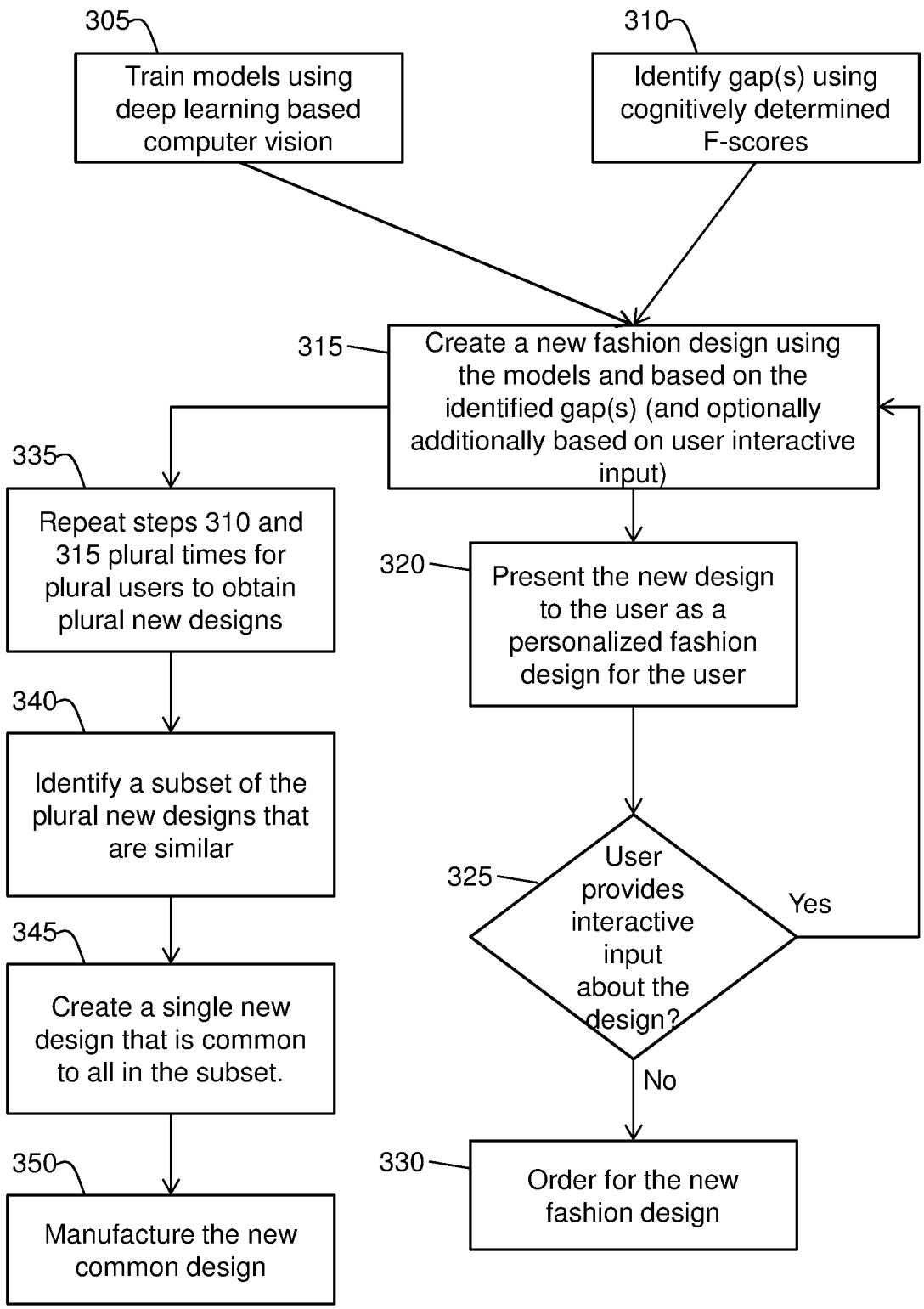
FIG. 3 shows a flowchart of steps of an exemplary method in accordance with aspects of the invention.

FIG. 3 shows a flowchart of an exemplary method in accordance with aspects of the invention. Steps of the method of FIG. 3 may be performed in the environment illustrated in FIG. 2, and are described with reference to elements shown in FIG. 2.

At step 305, the system trains models using deep learning based computer vision. In embodiments, the fashion design automation server 220 stores or has access to a database that includes a corpus of plural of images of fashion designs. The images are training data that are tagged with metadata that defines different aspects of the fashion design shown in each image. For example, for any particular one of the images, the metadata may define a type of clothing article in the image (e.g., an image might be tagged as a shirt, blouse, dress, gown, pant, hat, glove, shoe, etc.) The metadata may also define components of the clothing article in the image (e.g., a shirt might be tagged with components of torso, collar, sleeve, etc.). The metadata may also define subcategories of the components of the clothing article in the image (e.g., a collar might be tagged as one of: band, button down, mandarin, spread, wing, high neck, etc.). These examples of tags are merely for illustration and any desired number and types of tags may be used with implementations of the invention.

According to aspects of the invention, the modeling module 230 is programmed with logic that defines one or more models that use deep learning based computer vision to perform image classification, object detection, instance segmentation, and transfer learning of the images of the training data. In embodiments, the deep learning is machine learning that utilizes conventional or later developed neural network techniques. Examples of techniques that may be used in embodiments include but are not limited to: Convolutional Neural Networks (CNN), Region-based Convolutional Neural Networks (R-CNN), Fast R-CNN, Faster R-CNN, Mask R-CNN, Haar Cascades, and Local Binary Pattern (LBP) Cascades. In this manner, the modeling module 230 uses the images of the training data to train the models to identify different parts of a fashion design represented in the image, i.e., to identify and categorize all the fashion glossary concepts (e.g., type, components, and sub-components) included in an image of an existing fashion design. After the models are trained using the training data, the models can be used with confidence to perform computer vision based identification and categorization of the fashion glossary concepts (e.g., type, components, and subcomponents) included in an image of a fashion design that is not part of the training data. In this manner, once the models are trained, they may be used to perform image classification and object detection in new images of fashion designs.

In accordance with aspects of the invention, the modeling module 230 is programmed with logic to use the images of the training data to train the models to learn how certain components are spatially related to other components in fashion designs. As but one example, the models may be trained to learn that when a dress has a mandarin collar, the size of the collar has a certain aspect ratio relative to other components of the dress (e.g., relative to the torso and sleeves), and that the collar is located at a certain position relative to other components of the dress (e.g., relative to the torso, relative to the sleeves, etc.). In this manner, the models are trained to learn how different components visually fit together within a fashion design. Accordingly, and based on this training, the models may be used (e.g., by the designing module 250) to generate new fashion designs by combining plural different components using the learned spatial relationships amongst the components.

Figure 4A:
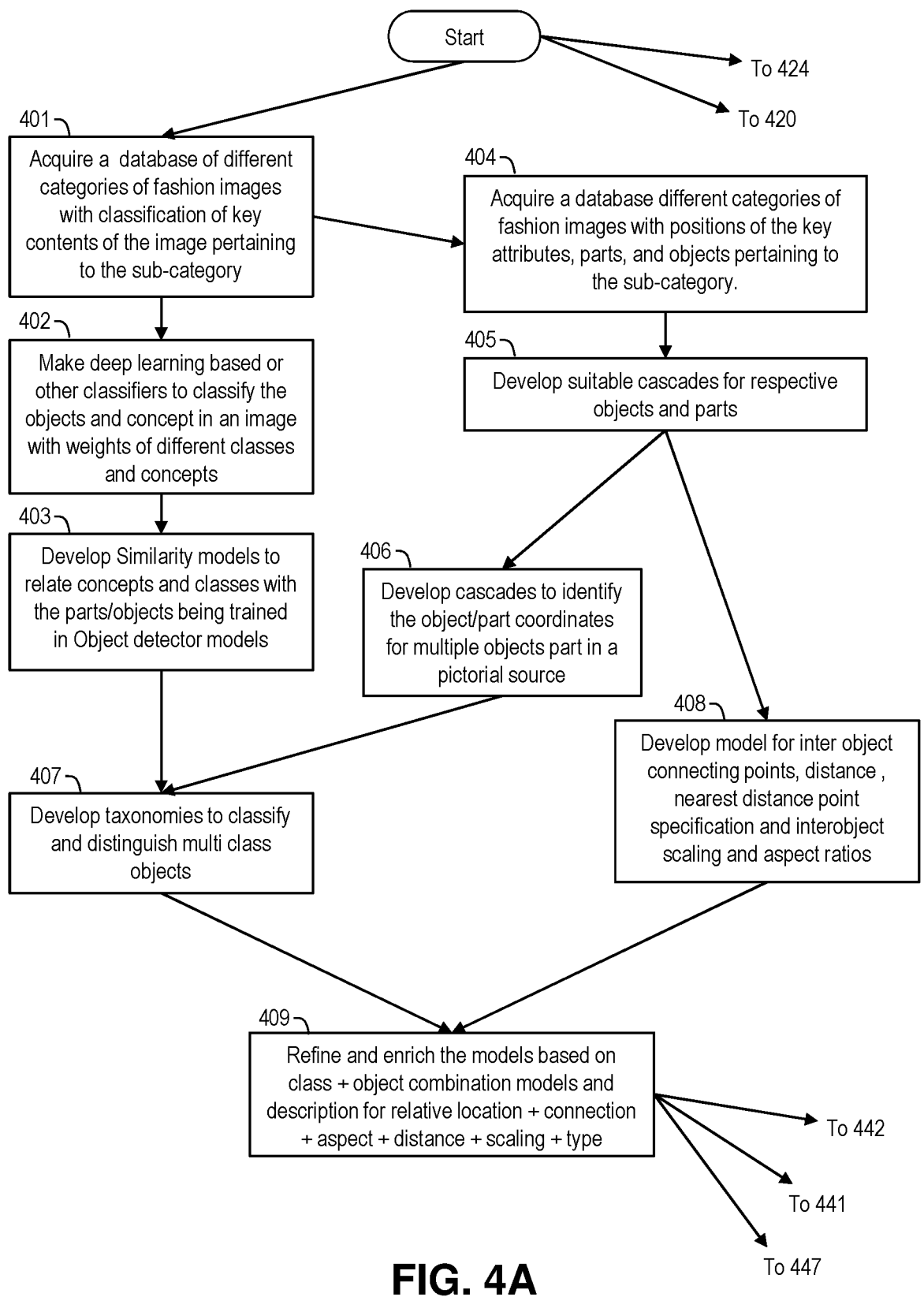
FIGS. 4A-C show a flowchart of steps of an exemplary method in accordance with aspects of the invention.

In embodiments, step 305 may be implemented using steps 401-409 of FIG. 4A, described in greater detail herein. Implementations are not limited to these particular steps, however, and other computer based techniques may be used to train the models at step 305.

At step 310, the system identifies one or more gaps using cognitively determined F-scores. In embodiments, the gap identifying module 240 of the fashion design automation server 220 accesses a catalog of plural existing fashion designs (e.g., images) and determines an F-score for each one of the plural existing fashion designs. The catalog may comprise, for example, plural images that define an inventory of fashion designs that are offered for sale by a particular fashion retailer. In embodiments, the gap identifying module 240 also accesses a purchase history of a user and determines an F-score for each fashion product purchased by the user as defined in the purchase history. In accordance with aspects of the invention, the gap identifying module 240 compares the F-scores of the catalog of plural existing fashion designs to the F-scores of the fashion products contained in the user's purchase history, and uses this comparison to quantitatively determine how similar or dissimilar the catalog of plural existing fashion designs is to the fashion products contained in the user's purchase history. In embodiments, the gap identifying module 240 determines that a gap exits when the measure of dissimilarity exceeds a threshold amount.

According to aspects of the invention, the F-score is based on a determined fashionability and price elasticity of the fashion design. In embodiments, the fashionability of a fashion design is determined using cognitive analysis of fashion data obtained from external sources such as external data servers 290. As described with respect to FIG. 2, the fashion data may include images, videos, text articles/comments, sales data for fashion products, customer satisfaction information for fashion products, and/or other data that relates to fashion trends and/or fashion products. By applying cognitive analysis techniques to the fashion data associated with a particular fashion design, the system may determine a numerical measure of a dimension (e.g., trendiness) of the particular fashion design. In this manner, the gap identifying module 240 may be programmed with logic to determine an F-score of a particular fashion design (e.g., an image of a fashion product in a fashion retailer's catalog, or an image of a fashion product from the user's purchase history) by performing cognitive analysis of the fashion data associated with other fashion designs that are similar to the particular fashion design.

In embodiments, the gap identification at step 310 includes analyzing pricing data in relation to the determined F-scores. For example, as described in greater detail with respect to steps 420-435 of FIG. 4B, the gap identification at step 310 may include analyzing: price range, average price, and price elasticity for each F-Score group at different price points; determining interaction effect and part partial correlation between all F-Score groups; determining interaction effect and part partial correlation of an assortment within an F-Score group on each product; measuring the interaction and partial effect of correction value on forecasts of other F-Score groups; correcting revised forecast estimates for the interaction and partial correlation effects; and measuring a quantity gap at profitable price elasticity, with minimal cannibalization of the F-Score and the associated trended F-Score and respective product images. In this manner, implementations of the invention include a mechanism to predict the likely sales of such a designed fashion product, the interaction effects of the same on existing products in the subcategory and within a particular F-Score range, and the optimal design components that should be part of the product. Implementations are not limited to these particular steps, however, and other cognitive analysis techniques may be used to identify the gaps at step 310.

At step 315, the system creates a new fashion design using the models (from step 305) and based on the identified gaps (from step 310). In embodiments, the designing module 250 is configured to generate a new fashion design (e.g., a visual representation of a fashion product such as a new article of clothing) by combining plural different components using the learned spatial relationships amongst the components. The components used in the new fashion design are determined from the F-scores of components and the one or more gaps determined at step 310. The learned spatial relationships amongst the components are included in the trained models from step 305. In embodiments, the designing module 250 is programmed with logic that uses the trained models to create the new fashion design by visually stitching together and homogenizing the identified components.

Figure 4B:
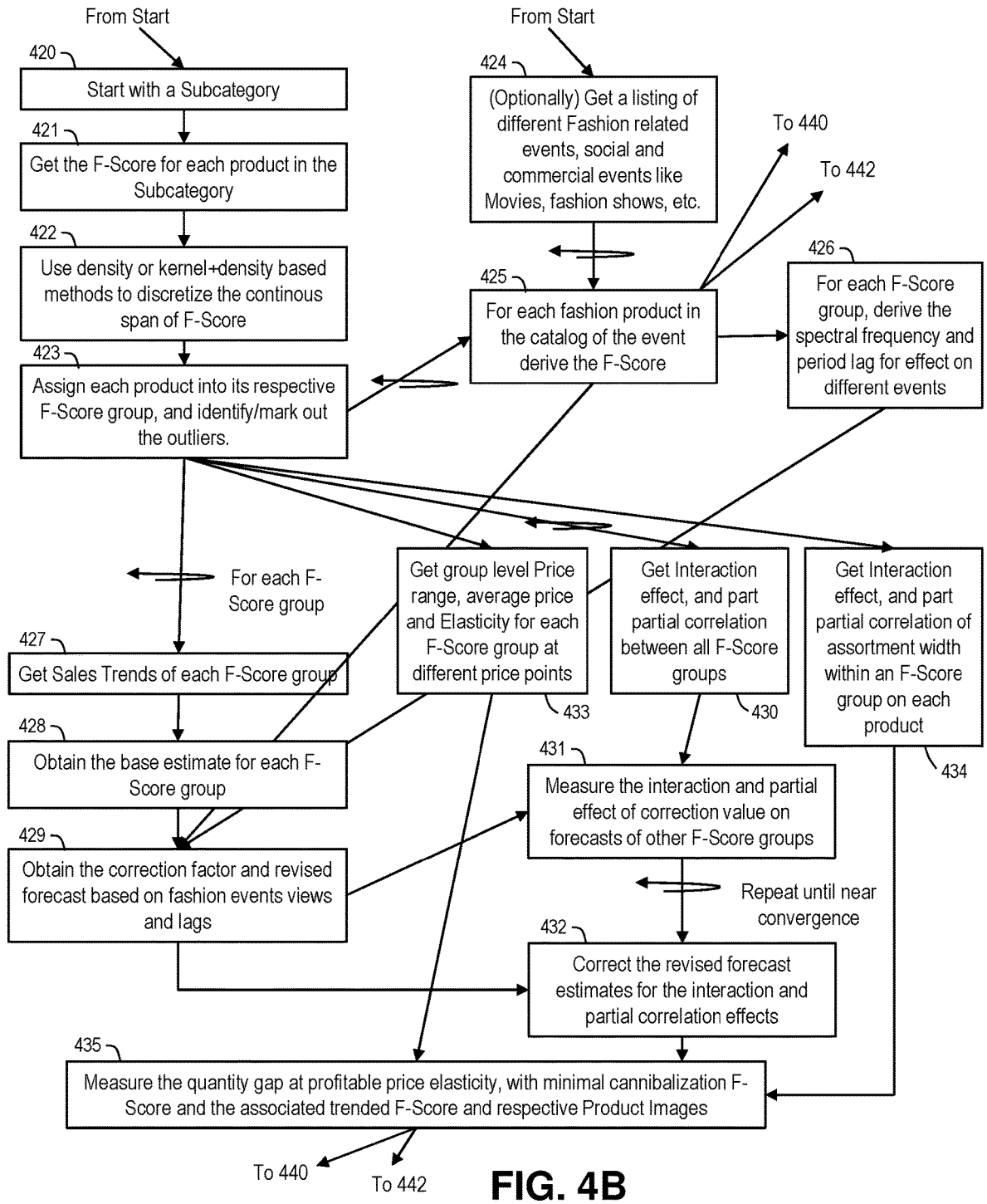
Figure 4C:
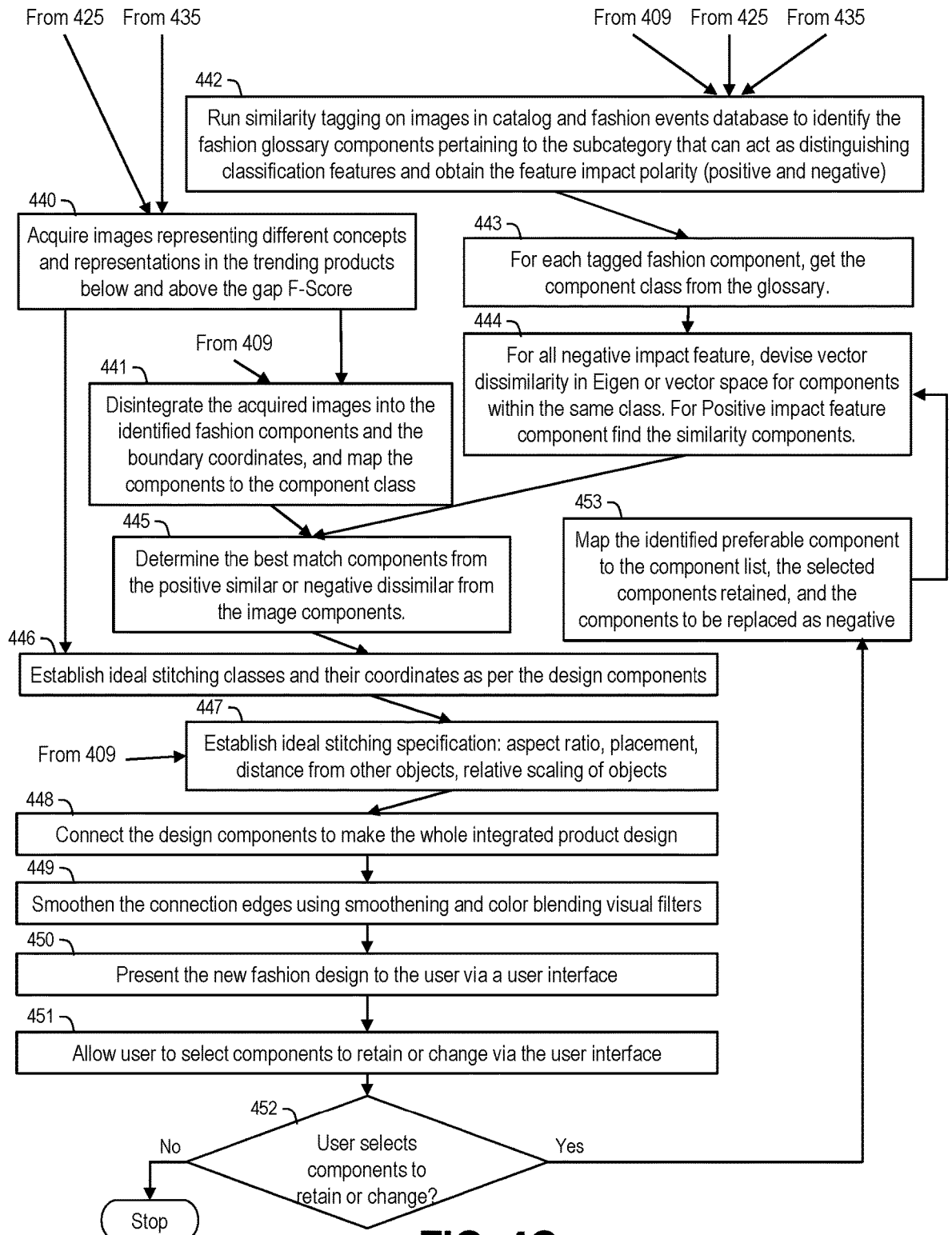

In embodiments, step 315 may be implemented using steps 440-453 of FIG. 4C, described in greater detail herein. For example, the designing module 250 may be programmed to: acquire images representing different concepts and representations in the trending products below and above the gap F-Score, the acquiring being based on the determined F-score and gap determined by the gap identifying module 240; and disintegrate the acquired images into the identified fashion components and the boundary coordinates, and map the components to the component class using image classification and object detection functions of the trained models from the modeling module 230. Moreover, the designing module 250 may run similarity tagging on images in the catalog and the fashion events database to identify the components pertaining to the subcategory that can act as distinguishing classification features and obtain the feature impact polarity (positive and negative), the similarity tagging being performed based on the determined F-score and gap determined by the gap identifying module 240 and the trained models from the modeling module 230. For each tagged fashion component, the designing module 250 may obtain the component class from the glossary. For all negative impact features, the designing module 250 may devise vector dissimilarity in Eigen or vector space for components within the same class. For all positive impact feature component the designing module 250 may determine the similarity components. Further, the designing module 250 may determine the best match components (from the components identified from the disintegrated acquired images) based on the determined positive impact features and the determined negative impact features. The designing module 250 may then combine the best match components into a single new fashion design using the learned spatial relations in the trained models from the modeling module 230. Combining the best match components may include: establishing ideal stitching classes and their coordinates as per the design components; establishing ideal stitching specification based on aspect ratio, placement, distance from other objects, relative scaling of objects; connecting the design components to make the whole integrated product design; and visually smoothing the connection edges of the connected components using computer based image smoothing, color blending, and/or visual filtering. The end result is a computer generated fashion design, e.g., a visual representation of a fashion product such as a new article of clothing, that can be displayed via a computer device. Implementations are not limited to these particular steps, however, and other computer based techniques may be used to generate the new fashion design at step 315.

At step 320, the system presents the new fashion design (from step 315) to the user. In embodiments, the fashion design automation server 220 transmits data defining the new fashion design to the user device 210, and the user module 260 causes the new fashion design to be displayed on the display of the user device 210, e.g., in a user interface (UI) generated by or associated with the user module 260.

In a first exemplary use case, the system is configured to accept user input as feedback on the new fashion design, and to revise the new fashion design based on the feedback. For example, the user interface presented by the user module 260 may prompt the user for user input on the fashion design that it visually displayed in the user interface. The user input may be, for example and without limitation, selecting one or more components of the displayed new fashion design with a mouse or touch screen input. The selection may comprise, for example and without limitation, selection of individual components (e.g., by clicking or tapping on a single component on the display) or selection of a group of components (e.g., by using a capture tool such as a resizable rectangle around plural components on the display). The user input may include, for each selected component, an indication of whether the user likes or dislikes the selected component. In this manner, the user module 260 may receive user input that defines whether the user likes or dislikes one or more selected components of the displayed new fashion design.

At step 325, if the user provides such user input on the displayed new fashion design, then the process returns to step 315 to create a next iteration new fashion design by revising the previous new fashion design based on the user input. In embodiments and based on the user input, the designing module 250 adds components that the user liked to the previously determined group of positive impact features and adds components that the user disliked to the previously determined group of negative impact features. The designing module 250 then re-runs the generating step using the updated groups of positive impact features and negative impact features, which results in the creation of the a next iteration new fashion design. The next iteration new fashion design is then presented to the user at step 320 and the user may provide user input on the next iteration new fashion design at step 325. In this manner, the system provides an iterative and interactive process in which the user may provide feedback to customize the new fashion design to their liking, with the end result being a highly personalized new fashion design for the user.

At step 330, the system may order the new fashion design that is a result of the user interaction process. For example, the user device 210 may transmit order data to the retailer device 270 and/or the designer device 280, the order data defining the last iteration (e.g., user accepted iteration) of the new fashion design that was generated by the fashion design automation server 220. The order data may include an indication that the user is willing to purchase a tangible (i.e., real world) fashion product that embodies the new fashion design. In response, the fashion retailer may acquire the requested fashion product and sell the fashion product to the user. Additionally or alternatively, the fashion designer may physically manufacture the requested fashion product and sell the fashion product to the user and/or one or more fashion retailers. In this manner, the user may be provided with a made to order fashion product that is based on a computer generated fashion design.

In a second exemplary use case, the fashion retailer may utilize the new fashion design that results from step 315 to acquire tangible fashion products that embody the new fashion design. In this use case, there is no user feedback (i.e., step 325 is not performed and step 315 is not repeated after the first instance). As described herein, the new fashion design that is generated at step 315 is based in part on one or more gaps that are identified based on existing fashion designs offered by the fashion retailer. The new fashion design that is generated at step 315 is also based in part on price, price elasticity, cascading effects, and current fashion trends that are determined to be popular. As such, the new fashion design that is generated at step 315 represents a fashion product that is predicted to be profitable for the fashion retailer. Accordingly, the fashion retailer may wish to utilize this information by acquiring and selling tangible fashion products that embody the new fashion design. Therefore, in embodiments, the retailer device 270 may transmit order data to the designer device 280, the order data defining the new fashion design that is generated at step 315. The order data may include an indication that the fashion retailer is willing to purchase a number of tangible (i.e., real world) fashion products that embody the new fashion design. In response, the fashion designer may physically manufacture the requested fashion product and sell the fashion product to the fashion retailer. In this manner, the fashion retailer may be provided with a fashion product that is based on a computer generated fashion design that is predicted to be profitable based on cognitive analysis of fashion data.

In a third exemplary use case, the fashion designer may utilize plural different new fashion designs generated by the fashion design automation server 220, and create a single new fashion design based on the plural different new fashion designs. For example, at step 335, the system may collect plural different new fashion designs generated in plural different instances of steps 310 and 315.

At step 340, the system identifies a subset of the plural new designs that are similar to one another. In embodiments, the fashion design automation server 220 determines similarity of new designs by determining a measure of similarity of components of the plural different new fashion designs, e.g., using tags already associated with the various components of each of the plural different new fashion designs and/or by performing image classification and object detection of each of the plural different new fashion designs using the trained models. Clustering methods may be applied to the similarity data to identify the subset of the plural new designs that are similar to one another.

At step 345, the system creates a single new design that is common to all in the subset from step 340. In embodiments, the designing module 250 may define a group of positive impact features to include similar components from ones of the subset of the plural new designs. The designing module 250 then re-runs generating step 315 using the defined group of positive impact features, which results in the creation of the single new fashion design that is based on the plural fashion designs included in the subset.

At step 350, the fashion designer may physically manufacture a fashion product that embodies the single new fashion design that is based on the plural fashion designs included in the subset, and may sell the fashion product to fashion retailers and/or fashion customers.

FIGS. 4A-C show a flowchart of an exemplary method in accordance with aspects of the invention. Steps of the method of FIGS. 4A-C may be performed in the environment illustrated in FIG. 2, and are described with reference to elements shown in FIG. 2.

Referring to FIG. 4A, steps 401-409 illustrate exemplary steps that may be performed in generating and training the models as described at step 305 of FIG. 3. In embodiments, at step 401 the fashion design automation server 220 may acquire, from a database, fashion data identifying different categories of fashion product images with classification information (or tags). Each tag may identify key contents of each fashion product image pertaining to a sub-category. As illustrative examples, an image of a dress may be tagged as a "Basque" with "Mandarin Collar", "Bishop Sleeve" etc. The fashion design automation server 220 may access data from the one or more external data servers 290 using application programming interface (API) calls in which the one or more external data servers 290 store fashion data within applications and/or databases.

At step 402, the fashion design automation server 220 may apply deep learning based or other classifiers to classify objects in an image with weightings of different classes and concepts. Step 402 involves using computer vision based classification techniques described herein to classify objects in the images acquired at step 401. In embodiments, the fashion design automation server 220 may use image analysis techniques to identify fashion products, social media filtering techniques and/or other cognitive and deep learning processes to identify images, comments, articles, etc., related to fashion products (e.g., by subject matter category filtering techniques, hashtag filtering, etc.), natural language processing (NLP) techniques to determine articles and/or other text that relates to fashion products, etc. to classify the objects.

At step 403, the fashion design automation server 220 may develop similarity models to relate concepts and classes with the parts/objects being trained in object detector models. For example, the fashion design automation server 220 may develop the similarity models by identifying similar attributes of fashion products from images and using the similarities as inputs to an object detector model to classify new fashion products that are added to a database or catalogue of fashion products.

At step 404, the fashion design automation server 220 may acquire a database of different categories of fashion images with positions of the key attributes, parts, and objects pertaining to subcategories. In embodiments, the fashion design automation server 220 may access data from the one or more external data servers 290 using application programming interface (API) calls in which the one or more external data servers 290 store fashion data within applications and/or databases.

At step 405, the system uses computer vision based object detection techniques described herein to detect objects in the images acquired at step 401 and/or step 404. In embodiments, the fashion design automation server 220, using techniques, such as R-CNN, Haar, LBP Cascade, may develop suitable cascades for respective objects and parts. The cascades may be used to translate images, videos, and/or other related media into fashion related data that may be inputted into one or more mathematical models to identify latest trends, as well as fashion scores for parts of a fashion object, an entire fashion object, and/or an ensemble of fashion products across multiple types of domains.

The output generated at step 405 is used at steps 406 and 408. In particular, at step 406, the fashion design automation server 220 may develop cascades to identify the object/part coordinates for multiple objects part in a pictorial source. At step 408, the fashion design automation server 220 may develop a model for inter-object connecting points, distance, nearest distance point specification and inter-object scaling and aspect ratios.

The output generated at steps 403 and 406 is used at step 407 to develop taxonomies to classify and distinguish multi-classification objects. As an illustrative, non-limiting example, the fashion design automation server 220 may develop classification criteria that a fashion product having a woolen fabric and a compressed texture should be classified as a "boiled wool garment." As another example, the fashion design automation server 220 may develop classification criteria that a fashion product having a particular brand of fabric with a run length from the center of the waist to the outer edges of the shoulders should be classified as "bretelles."

The output generated at steps 403 and 406 is used at step 407 to at step 409 to refine and enrich the models, the fashion design automation server 220 may refine and enrich the classification models. For example, the fashion design automation server 220 may refine and enrich the classification models based on classification and object combination models and description for relative location, connection, aspect, distance, scaling, type. The models that are output at step 409 may be used at each of steps 441, 442, and 447 of FIGS. 4B and 4C, as described herein.

Referring to FIG. 4B, steps 420-435 illustrate exemplary steps that may be performed in identifying the gaps using cognitively determined F-scores as described at step 310 of FIG. 3. Steps 420-435 may be performed independently of steps 401-409 of FIG. 4A.

Steps 420-426 illustrate determining F-scores of fashion products. In embodiments, at step 421 the fashion design automation server 220 may obtain an F-Score for each product in the subcategory. For example, the fashion design automation server 220 may determine an F-Score using any suitable technique in which the F-Score indicates various measurements across multiple domains for the fashion product. As described herein, the F-score may indicate a measure of consumer value, a measure of consumer popularity, a measure of how closely the object conforms to a particular style or pattern, (e.g., a modern style score, a vintage style score, etc.), a measure of how profitable the object is for a seller, a measure of trendiness, etc. In embodiments, the F-score may be generated based on sales data, a rules engine that defines the scores based on product attributes, consumer/critic feedback ratings and narratives from social media and/or other platforms, etc. As described herein, each portion or sub-category of a fashion product may include a set of F-scores.

At step 422, the fashion design automation server 220 may use density or kernel and density-based techniques to discretize the continuous span of F-Score. At step 423, the fashion design automation server 220 may assign each product into its respective F-Score group and identify/mark out any outliers. For example, the fashion design automation server 220 may store information that groups fashion products having similar F-scores together. The F-score groups defined at step 423 are used at steps 427, 530, 433, and 434 as described herein.

At step 424, the fashion design automation server 220 may obtain a listing of different fashion related events, social and commercial events such as movies, fashion shows, etc. For example, the fashion design automation server 220 may obtain the listening of events from one or more external data servers 230. At step 425, for each fashion product in a catalogue of events, the fashion design automation server 220 may derive respective F-scores (e.g., using similar processes as described above with respect to step 421). The output of step 425 may be used at steps 426, 440, and 442 as described herein. At step 426, the fashion design automation server 220 may, for each F-Score group, derive a spectral frequency and period lag for effect on different events, such as fashion shows, etc.

Steps 427-429 illustrate determining correction factors and revised forecasts for each F-score group from step 423 based in part on pricing and sales concerns of a fashion retailer. In embodiments, at step 427 the fashion design automation server 220 may obtain sales trends of each F-Score group. For example, the fashion design automation server 220 may communicate with the external data servers 290 that stores sales trends for each product, and the fashion design automation server 220 may store information linking the sales trends for the fashion products in connection with respective F-scores for the fashion products. At step 428, the fashion design automation server 220 may obtain a base estimate for each F-Score group. At step 429, the fashion design automation server 220 uses the output of steps 425, 426, and 428 to determine a correction factor and revised forecast based on fashion event views and lags. The correction factor and revised forecast determined at step 429 may be used at step 431 and 432 as described herein.

Steps 430-432 illustrate determining interaction effects and partial correlations between the F-score groups defined at step 423. In embodiments, at step 430 the fashion design automation server 220 may obtain interaction effect information, and part partial correlation between all F-Score groups. At step 431, based on the correction factor and revised forecast from step 429 and the interaction effect information and part partial correlation 430, the fashion design automation server 220 may measure the interaction and partial effect of correction value on forecasts of other F-Score groups. For example, trend data may indicate that prior trends are no longer fashionable, thereby altering the trendiness fashion score for prior fashion products, or by altering the "interaction effect" of fashion products in an ensemble when those fashion products are more or less compatible as determined by updated trends. As such, as new trend data is available, fashion scores are accordingly updated to capture and account for the changes to the interaction effect, trendiness scores, etc. At step 432, the fashion design automation server 220 may correct the revised forecast estimates for the interaction and partial correlation effects, repeating until near convergence.

At step, 433, the fashion design automation server 220 may obtain (e.g., from the external data servers 290) group level price range, average price and elasticity for fashion products at each F-Score group at different price points. The external data servers 290 may organize and/or group fashion products by price range, average price and elasticity by F-scores of the fashion products. At step 434, the fashion design automation server 220 may obtain interaction effect information, and part partial correlation of assortment within an F-Score group on each product. For example, the fashion design automation server 220 may determine an "interaction effect" in which the fashion score of an ensemble is based on how different fashion products (e.g., articles of clothing, accessories, etc.) interact with each other. That is, even if two individual fashion products have high fashion scores individually, when put together in an ensemble, the fashion score of the ensemble may not necessarily be high. In embodiments, the interaction effect can be applied by analyzing fashion trends, and scoring attributes of the entire ensemble based on the fashion trends, consumer popularity, etc. In embodiments, steps 433 and 434 are performed for each of the F-score groups defined at step 423.

At step 435, the fashion design automation server 220 uses the output of steps 432, 433, and 434 to measure the quantity gap at profitable price elasticity, with minimal cannibalization F-Score and the associated trended F-Score and respective product images. The gap determined at step 435 is the gap described with respect to step 315 of FIG. 3. In embodiments, the gap corresponds to a quantitatively expressed difference between fashion products that a fashion retailer offers and what is cognitively determined as fashionable and profitable based on current fashion data from the external data servers 290.

Referring to FIG. 4C, steps 440-453 illustrate exemplary steps that may be performed in creating a new fashion design, presenting the fashion design to a user, and receiving user input to interactively and iteratively revise the new fashion design, as described at steps 315, 320, and 325 of FIG. 3.

Step 440-445 illustrate determining particular components (e.g., images of a particular sleeve, collar, torso, etc.) from fashion images to include in the new fashion design, where the determining is based on the determined F-scores and gaps. At step 440, the fashion design automation server 220 uses the F-scores from step 425 and the gap(s) from step 435 to acquire images representing different concepts and representations in the trending products below and above the gap F-Score from step 435. At step 441, the fashion design automation server 220 uses the models from step 409 to disintegrate the acquired images from step 440 into the identified fashion components and the boundary coordinate, and map the components to the component class.

At step 442, the fashion design automation server 220 uses the models from step 409, the F-scores from step 425, and the gap(s) from step 435 to run similarity tagging on images on the catalog and fashion events database to identify the fashion glossary components pertaining to the subcategory that can act as distinguishing classification features and obtain the feature impact polarity (positive and negative). At step 443, the fashion design automation server 220, for each tagged fashion component from step 442, obtains the component class from a glossary. As an illustrative example, when a component of a fashion product is tagged as "Mandarin Neck," the fashion design automation server 220 may determine that the classification is neck style for dresses. At step 444, the fashion design automation server 220 may, for all negative impact features, devise vector dissimilarity in Eigen or vector space for components within the same class. For positive impact feature components, the fashion design automation server 220 may find the similarity components.

At step 445, the fashion design automation server 220 uses the mapped components and classes from step 441 and the determined positive and negative impact features from step 444 to determine the best match components from the positive similar or negative dissimilar from the image components. For example, the fashion design automation server 220 may determine a group of different fashion components (e.g., sleeve, collar, etc.) to be combined in a fashion product (e.g., shirt, dress, etc.) that maximizes the fashion scores in the domains specified by the criteria. For example, if the criteria indicate that the product should be a formal evening dress, have a high level of trendiness, and be of a vintage style, the fashion design automation server 220 may determine a group of different fashion components to be combined into a fashion design to maximize a trendiness score, a vintage style score, and a formal evening dress score.

Steps 446-449 illustrate combining the determined components into a new fashion product using the models from step 409. At step 446, the fashion design automation server 220 establishes ideal stitching classes and their coordinates as per the design components. At step 447 the fashion design automation server 220 uses the components from step 446 with the models from step 409 to establish an ideal stitching specification (e.g., image stitching), such as aspect ratio, placement, distance from other objects, relative scaling of objects.

At step 448, the fashion design automation server 220 connects the design components from step 445 according to the visual stitching determined at step 447 to make the whole integrated product design. For example, the fashion design automation server 220 generates a new fashion design by combining the best match components from step 445 based on the stitching classes and specifications from step 447. At step 449, the fashion design automation server 220 smoothens the connection edges of the components in the visual image of the new fashion design using one or more of smoothening, color blending, and visual filters. The end result is a new computer generated fashion design, e.g., a visual representation of a fashion product such as a new article of clothing, which can be displayed via a computer device.

The new fashion design that is output at step 449 may be used as the basis for the second and third exemplary use cases described with respect to FIG. 3. For example, in the second exemplary use case, a fashion retailer may utilize the new fashion design that results from step 449 to acquire tangible fashion products that embody the new fashion design. Alternatively, in the third exemplary use case, fashion designer may utilize the new fashion design from step 449 as one of plural different new fashion designs, and create a single new fashion design based on the plural different new fashion designs, e.g., as described at steps 335, 340, and 345 of FIG. 3.

The new fashion design that is output at step 449 may also be used as the basis for the first exemplary use case described with respect to FIG. 3, e.g., in which a user interactively and iteratively modifies the new fashion design until the user is satisfied. For example, at step 450 the new fashion design from step 449 may be presented to the user at the user device 210, e.g., via a graphical user interface displayed on the user device 210.

At step 451, the system may permit the user to provide user input (e.g., feedback) on the new fashion design. The user input may be, for example and without limitation, selecting one or more components of the displayed new fashion design with a mouse or touch screen input. The selection may comprise, for example and without limitation, selection of individual components (e.g., by clicking or tapping on a single component on the display) or selection of a group of components (e.g., by using a capture tool such as a resizable rectangle around plural components on the display). The user input may include, for each selected component, an indication of whether the user likes or dislikes the selected component. In this manner, the user module 260 may receive user input that defines whether the user likes or dislikes one or more selected components of the displayed new fashion design.

At step 452, the system determines whether the user provided input on any one or more components of the new fashion design. In the event the user provides input, then at step 453 the system maps the identified preferable component to the component list, the selected components retained, and the components to be replaced as negative. In embodiments, based on the user input from step 451, the system adds components that the user liked to the previously determined group of positive impact features and adds components that the user disliked to the previously determined group of negative impact features. The process then returns to step 444 with updated groups of positive impact features and negative impact features. The system then repeats the steps to generate a new fashion design using the new groups of groups of positive impact features and negative impact features, the result being a revised new fashion design at step 449 that is presented to the user at step 450. The process may repeat in this manner over any number of iterations until the user is satisfied with the new fashion design.

As described herein with respect to FIGS. 2-4, aspects of the invention use cognitive and quantified F-Score as obtained for different products in different categories and sub-categories of fashion under eCommerce and omni-channel retail for fashion designing and related decision. The F-Score as used herein has cognitive and artificial intelligence capabilities. Conventional methods of determining fashionability are based on invasive surveys of limited users. In contrast, the F-score is determined using advanced artificial intelligence and computer vision algorithms to make systems smart enough to handle the cognitive loads of understanding fashion.

The F-Score as used herein can be used to determine a fashionability score of every product in every fashion sub-category under eCommerce and omni-channel retail. Conventional methods of determining fashionability are based on finding a user's fashion genre which could be transferred to products as sub-optimal representational. In contrast, implementations of the invention compute a fashion score of a product within its fashion subcategory, even in cases when the product is new and not seen by any user, and without requiring any user to first express their liking or disliking. Moreover, the F-score as used herein is not just a broad genre, but is a quantitatively determined number with a dimension that can be used in downstream machine learning algorithms requiring numerical data.

The F-Score as used herein provides the flexibility to choose from different underlying cognitive algorithms automatically based on different sub-categories under different conditions. The cognitive phenomena and hence the algorithm that may best define fashionability for different sub-categories may differ from person to person and, thus, there is no one-size fits all approach. As such, the flexibility to cognitively identify and select the right artificial-intelligence methodology, topology, and network is instrumental to determining the correct association between products and their fashionability scores within their fashion sub-category. Conventional methods of determining fashionability are not based on cognitive analysis and are not flexible enough to differentiate across different algorithms.

The F-Score as used herein provides dynamic adaptability to evolving differences in distribution of F-Scores based on social media events, fashion events, movies, cultural differences, weather differences, and location differences, to name a few. Fashion is a dynamic concept, always evolving over time.

Conventional methods of determining fashionability are based on user surveys, the usefulness of which lags in time behind real world changes in fashion opinion. As a result, it is not practically feasible, fair or even viable to have human fashion designers attempt to understand the fashion needs of each customer and design according to the preferences of each customer individually. Accordingly, aspects of the invention use artificial intelligence and machine learning to understand each customer's needs, across all their transactions and across all the fashion sub-categories. In this manner implementations of the invention provide for personalized fashion designing using cognitive-based fashionability analysis and a cognitive F-Score that works across all fashion categories, for new and existing fashion and also could map the fashion to customers.

Personalized fashion design that is achieved in accordance with aspects of the invention (e.g., as described at FIGS. 2-4) provides the benefit of designing what an individual fashion customer wants, and thus avoids the problem of pushing only what designers create. Personalization is all about reflecting ones liking and is a form of expression. Under the conventional model, a person's expression in this regard has been limited by what is made available from fashion designers. True expression, however, lies in understanding what each individual user may like next under each fashion sub-category and designing something exactly like that, and offering that creation to the particular user so that they may express themselves accordingly. In embodiments, the system employs algorithms that map the time variant and evolving F-Score of each customer across each fashion sub-category. In this manner, implementations of the invention can be used to determine a new fashion design (e.g., a combination of different fashion components) that best suits the a particular customer's F-Score and liking, and a price at which the new fashion design will create the most positive perception and be profitable to a fashion retailer.

According to aspects of the invention, the F-score may be used to inform business decisions made by a fashion designer or a fashion retailer, e.g., in the form of integrating with fashion product acquisition decisions and adaptive "build or buy" decisions. For business that have a new product development function (such as designing a new fashion product in the fashion industry), the significant criteria to qualify a build decision is viability (e.g., time to market, feasibility and profitability) of filling a gap that exists between the existing (inventory) and probable (acquisition function) product line-up from different sources and price points. Therefore, such new development (fashion designing) decisions could not optimally taken in isolation without the integration of acquisition functions. Many times when these functions do not work in optimal synergies, it may lead to cannibalization of existing line-up or significant impact on the performance of the newly built line-up, which involves extensive fixed cost capital allocation and expensive design and development cost. As a result, the inventors have determined that the fashion designing process should be pluggable to provide inputs to, and take inputs from, the fashion acquisition function to be optimal.

In determining the gaps as described at steps 435, aspects of the invention use the F-score in determining a cascading interaction effect of fashion within same subcategory and across different subcategories. For example, as described at step 427-432, the system may analyze the effect of any new product development at a given price on the existing products sales, for both the products in the same fashion sub-category and also other fashion subcategories. For example, a retailer may decide to sell a new type of a mandarin-collared dinner gown similar to one that appeared in a leading fashion show. The retailer may decide to sell a particular quantity of the new dinner gown at a particular price. This decision by the retailer can have a cascading effect of other fashion products. For example, selling the new gown at the particular quantity and price may negatively impact the sales of another dinner gown that is currently in inventory. Similarly, selling the new gown at the particular quantity and price may positively impact the sales of a particular style of shoe that is currently in inventory and that matches the new gown. An example of a cascading interaction effect is that the increase in sales of the particular style of shoe that matches the new gown may negatively impact the sale of another type of shoes that is currently in inventory. As a result, it is often difficult for a fashion retailer to decide which fashion products to buy, how many units to buy, and the price at which to buy and sell. This problem exists both for acquisition of new fashion designs as well as for the re-purchase of exiting fashion designs.

Aspects of the invention also use the F-score and price elasticity data in determining the gaps at step 435. For example, as described at step 433, the system may obtain group level price range, average price and elasticity for fashion products at each F-Score group at different price points. Fashion sales quantity estimate is a complex function of price, perceived luxury, and fashion designer's perception, in addition to the fashion perception of the fashion design. A particular fashion design may sell very well at a given at given price and may sell poorly at a different price. Some fashion designs even sell better at higher prices than at lower prices. Another example or price elasticity is illustrated in that a fashion design may sell better under the brand name of one designer compared to the exact same fashion design offered under the brand name of another designer. The price elasticity distribution for different sub-categories of fashion may assume random variables at different levels and, regarding a fashion designer's reputation, it may lead to a complex mixed model random variable effect. The inventors have determined that this represents a significant factor in new product development, e.g., for determining what fashion products to make, for whom to target the products, how many units to make, and the price at which to sell the units.

Aspects of the present invention match a fashion-fad pace with new product development lead times, and strategic vendor prioritization. Popular fashion designers have achieved success, primarily because they were able to understand the fashion fad pace of different fashion, and optimize their new product development function (strategic design houses, vendor for raw materials, assembly and finished products for development of the designed product) accordingly. Additionally, fashion designers have achieved success by correctly matching the lead times of different fashion with their fad-pace and bringing the concept of agility as an important aspect for not only defining fashion, but also as a survivability criteria in fashion retailing. Any fashion acquisition process while determining what to make and how to price and position it, also incorporates in its already very complex computation, how long (not only lead time but also its variability) it takes to make each of the possible alternatives, and what is the cost of each unit at different production quantity. Additionally, a fashion design and acquisition process factors in the split of the new product development line-up across different fashion houses and vendors for most optimal time to market, cost, quality, and fashion-fad mapping for each fashion sub-category.

Aspects of the present invention may provide integration with fashion cross-sell and up-sell functions. Fashion is everything but stationary. It evolves for everyone across all fashion subcategories at different pace and in different directions. As such, designers either follow customers evolving fashion choices and try to serve them alone, or play a significant role in influencing the evolution pace and direction of their fashion choices, and thereby not only keep them engaged, but virtually deny any competition a role in serving customers. Not all users have a similar F-Score or fashion-ability as others. Individuals may be amenable to purchasing a more expensive product if it closely matches what they truly want, e.g., as indicated by the F-score as employed herein. For the individuals which are already at a higher time variant F-Score level in a given fashion sub-category, to keep them engaged and keep influencing their fashion liking, it is advantageous when an integration between the cognitive fashion designing and cognitive recommendation (existing customers) and cognitive marketing (new customers) functions is provided as in aspects of the present invention. Also, since aspects of the present invention can be used to create fashion designs at any F-Score level, aspects of the present invention may also be used to target the particular customers with the appropriate promotions to kick-start its sales and a review/rating process. This would otherwise require considerable time, effort, and even sub-optimal profits as a result of very low pricing to incite sale thereby also distorting the price-elasticity positioning of the product.

Aspects of the present invention provide the ability to dynamically adjust acquisition decisions based on fashion trends from fashion shows, fashion magazines, movies, local cultural events, weather etc. Aspects of the present invention could also map the F-Score at subcategory or lower level for each image as acquired from different events happening hyper-locally, locally, nationally or globally. Aspects of the present invention may include these insights in understanding the mapping the gaps current customers liking and future customer demands, and use these insights in fashion designing and related decisions, while at the same time optimizing on the other new product development challenges as explained above.

Aspects of the present invention may collect and analyze data from a variety of external sources, generate scores based on the data, and provide technical solutions to the technical problem of obtaining, maintaining, tracking, and updating, fashion related data. Aspects of the present invention improve the field of fashion design by applying technical solutions for obtaining, maintaining, tracking, and updating, fashion related data in a manner that would not be possible by human steps or via pen and paper. Aspects of the invention are computer based and have no pre-computer analog. For example, training computer models using deep learning based computer vision is necessarily computer based and cannot be performed by in the human mind or with pen and paper. Aspects of the present invention improve the functioning of computers and computer networks by reducing computing resources required for fashion design. For example, aspects of the present invention may automate fashion design tasks, which in turn, reduces the level of web-browsing and other related computing tasks required for fashion design by a human fashion designer.

Figure 5:
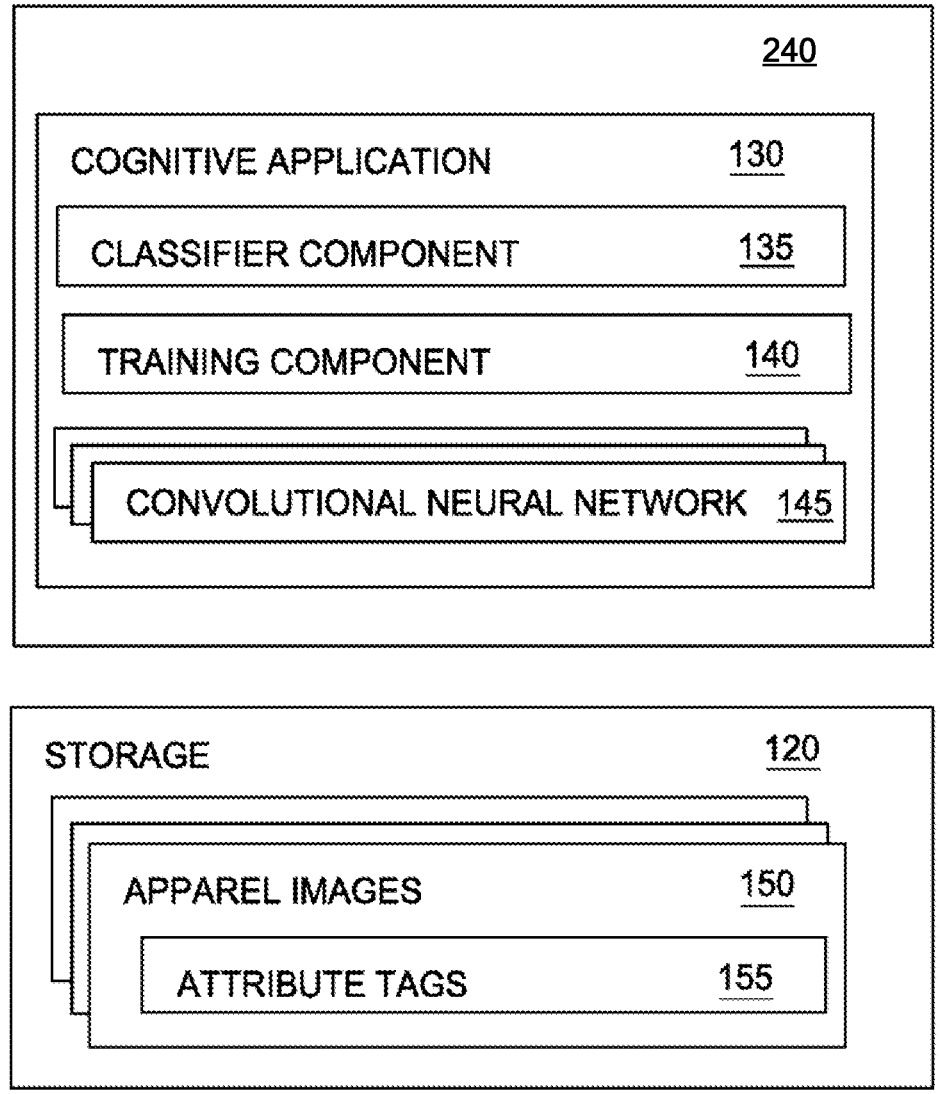
FIG. 5 shows aspects of the gap identifying module of the fashion design automation server in accordance with an embodiment of the invention.
Figure 6:
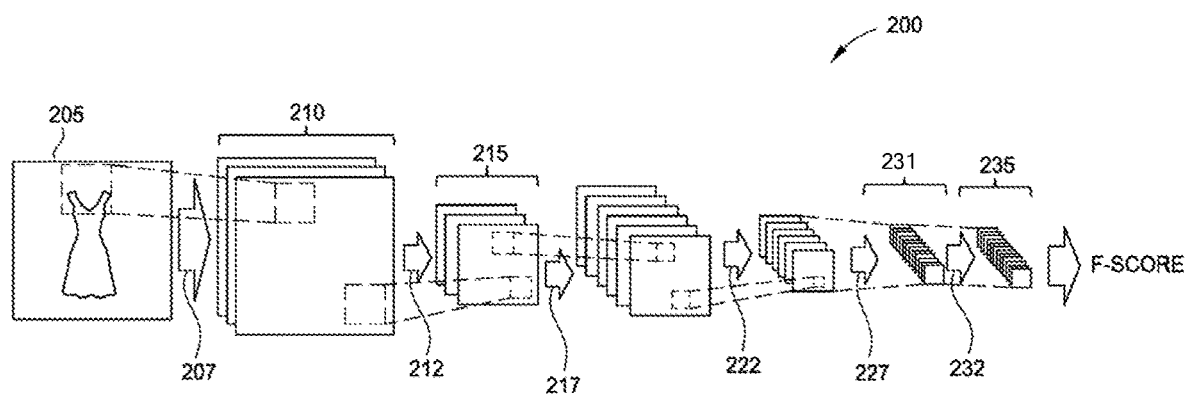
FIG. 6 illustrates a Convolutional Neural Network configured to analyze and classify apparel items in accordance with aspects of the invention.

FIGS. 5 and 6 illustrate an exemplary system and method for determining F-scores in accordance with aspects of the invention. FIG. 5 shows aspects of the gap identifying module 240 of the fashion design automation server 220 of FIG. 2 in accordance with an embodiment. In the illustrated embodiment, the gap identifying module 240 includes a Cognitive Application 130. The Cognitive Application 130 includes a Classifier Component 135, a Training Component 140, and a plurality of Convolutional Neural Networks 145. The Classifier Component 135 is generally configured to receive images of apparel items and determine which category of apparel item is depicted. In some embodiments, the Classifier Component 135 may include one or more machine learning models. In some embodiments, the Classifier Component 135 utilizes a deep learning system. In one embodiment, the Classifier Component 135 is trained based on the system in which it will be utilized. That is, in one embodiment, the Classifier Component 135 is trained based on the specific categories that are to be used in the particular implementation.

In one embodiment, the Classifier Component 135 is trained using labeled training data, such as Apparel Images 150. In the illustrated embodiment, each Apparel Image 150 stored in Storage 120 includes associated metadata describing the image, and/or describing apparel item depicted therein. (Storage 120 may be part of or accessible by the fashion design automation server 220 of FIG. 2.) For example, as illustrated, each Apparel Image 150 includes one or more Attribute Tags 155. In one embodiment, one such Attribute Tag 155 indicates which category the depicted apparel item belongs to. In this way, the tagged Apparel Images 150 can be used to train one or more cognitive models in the Classifier Component 135. For example, in one embodiment, each Apparel Image 150 is provided to a machine learning model as input, and the tagged category is provided as target output. After being trained, the Classifier Component 135 can then receive untagged Apparel Images 150 and determine which category or categories the depicted apparel item(s) belong to.

In some embodiments, the Apparel Images 150 used to train the Classifier Component 135 may be manually tagged or sorted by users based on the depicted apparel category. In some embodiments, one or more web crawlers can be utilized to automatically retrieve and tag the images for use. In one embodiment, web searches (e.g., on the Internet) can be initiated based on strings corresponding to each desired category, and the resulting images can be retrieved for training the Classifier Component 135. For example, in such an embodiment, training images for formal dresses may be retrieved by conducting one or more web searches for "formal dress," "evening gown," and other similar text strings that describe apparel items within the desired category. The retrieved images may then be automatically tagged with the appropriate category, which facilitates training of the Classifier Component 135. In some embodiments, the Classifier Component 135 also generates a confidence measure indicating how reliable the classification is. In some embodiments, if the generated confidence measure is below a predefined threshold, the image may be rejected, or flagged for verification by a user.

In the illustrated embodiment, the Cognitive Application 130 also includes a Training Component 140 which is used to generate and train the Convolutional Neural Networks 145. As discussed above, in some embodiments, there are one or more Convolutional Neural Networks 145 corresponding to each identified category of apparel. As will be discussed in more detail below, each Convolutional Neural Network 145 may be trained utilizing Apparel Images 150 and their corresponding Attribute Tags 155, such that the Convolutional Neural Networks 145 can process new untagged Apparel Images 150 and quantify the various attributes of the depicted apparel item. In various embodiments, the Attribute Tags 155 may include information regarding any number of attributes. For example, in various embodiments, such attributes may include the contemporariness of the apparel item (e.g., as determined based on the year the apparel item was released/announced or the year the associated image was published/featured), the designer of the apparel item, the brand of the apparel item, the publication that featured the apparel item (i.e., the magazine, website, television channel, etc. that published the corresponding image), and the like. Similarly, in some embodiments, additional attributes may include what the object is (e.g., a shirt, pants, shoes, etc.), the material the item is made of, a pattern of the material, a name of the item, an age-group associated with the item, a gender the item is designed for, price of the item, and the like. In some embodiments, the attributes may further include indications of the popularity of the item, such as survey responses, social media reactions, and the like.

In a related embodiment, the Convolutional Neural Networks 145 may additionally be trained on any number of concepts relating to the apparel items. For example, in some embodiments, one or more Convolutional Neural Network 145 may be trained based on concepts that influence fashion tastes across geography, time-periods, age-groups, socio-economic classes, social-media trends, movies and other events (with trends across different channels/age-groups, as well as an actor/model who was seen sporting which fashion), fashion magazines, designers (and their ranking/rating and associations), brand houses (and ranking of each), materials (and classes of each, with their association with different fashion), patterns (with types and association), along with cuts and styles of different fashion-related concepts for a sub-category as in fashion glossary, price-perception (ideal price as people suggest in formal/informal surveys for a particular dress), actual price (on a given channel/s), cost, and the like.

In order to facilitate the training of the Convolutional Neural Networks 145, the Apparel Images 150 may be tagged in a number of ways. For example, in one embodiment, users review each Apparel Image 150 to identify each attribute and tag it. In some embodiments, surveys may be utilized to identify the trendiness of an apparel item depending on the geographic region, age group, socio-economic class, and the like. In some embodiments, the Apparel Images 150 are retrieved by one or more web crawlers that conduct Internet searches using predetermined strings corresponding to the desired attributes. For example, to retrieve and tag apparel images used to train a Convolutional Neural Network 145 based on the designer of an evening gown, one or more web searches may be conducted using a strings such as "DesignerA evening gown," "DesignerB evening gown," "evening gown+DesignerC," and the like. The retrieved images can then be automatically tagged based on the search terms utilized to retrieve them. Similarly, in order to train a Convolutional Neural Network 145 based on the contemporariness of jewelry, web searches may be initiated with specific time constraints (e.g., per year, per three-year period, and the like).

FIG. 6 illustrates a CNN 200 configured to analyze and classify apparel items, according to one embodiment disclosed herein. In the illustrated embodiment, the CNN 200 receives an Image 205 of an apparel item (the depicted Image 205 is a women's dress), and outputs an F-Score. The CNN 200 and the Image 205 correspond to the CNN 145 and images 150, respectively, shown in FIG. 5. In some embodiments, the F-Score is a single value (e.g., between 0 and 1) quantifying the apparel item. In some embodiments, the generated F-Score is an N-dimensional vector, where N is the number of attributes used in the particular implementation. In one embodiment, the F-Score is a quantitative value that can be used to compare apparel items to determine their objective similarity based on fashion attributes. That is, all dresses with F-Scores of about 0.4 may be grouped together as satisfying similar fashion preferences.

In some embodiments, each CNN 200 is configured to analyze images based on a particular attribute, and the generated results (e.g., results vectors) are aggregated to generate the f-score. In other embodiments, a single CNN 200 may be configured to analyze images according to all of the attributes, and generate a multi-dimensional vector as the f-score, where each dimension corresponds to a particular attribute. As discussed above, in some embodiments, each category of apparel item may correspond to a set of one or more convolutional neural networks, and a CNN 200 trained to process a first category is not also used to process a second category of apparel.

In the illustrated embodiment, processing the input Image 205 with the CNN 200 involves a number of processing steps spread across a number of layers of neurons. For example, in one embodiment, processing the image may include one or more of convolution steps, non-linearity steps, pooling or sub-sampling steps, and classification steps. In the illustrated embodiment, the first operation (illustrated by arrow 207) is a convolution step. A convolution step typically involves processing the input region with one or more filters or feature detectors. For example, the convolution step may involve sliding a filter or feature detector (e.g., a predefined matrix of values) across the Image 205 (i.e., across a matrix of values corresponding to the pixel values at each pixel) and utilizing element-wise multiplication or dot products to generate a convolved feature, feature map, or activation map based on the corresponding pixel data. In the illustrated embodiment, three feature detectors are used, such that the generated Feature Map 210 has a depth of three. Of course, in various embodiments, any number of filters may be utilized.

In some embodiments, non-linearity is also introduced by replacing all negative values in the Feature Map 210 with a zero. In some embodiments, this operation is performed alongside the convolution step 207. As illustrated, the next processing step involves pooling 212 to create more manageable Feature Maps 215. For example, in the illustrated embodiment, pooling involves reducing the size of the Feature Maps 210 (e.g., reducing the size of the corresponding matrices) by using the maximum value in each region as the value in the pooled Feature Map 215. In the illustrated embodiment, the Convolutional Neural Network 200 includes an additional set of convolution, non-linearity, and pooling operations (e.g., as indicated by arrows 217 and 222). In various embodiments, any number of convolution operations may be utilized in the particular CNN 200, depending on the particular implementation.

As illustrated by arrows 227 and 232, after the convolution steps have been completed, the data is passed to one or more Classifier Layers 231 and 235. In one embodiment, these Classifier Layers 231 and 235 are fully connected, indicating that every neuron in the previous layer is connected to every neuron in the subsequent layer. For example, in one embodiment, the output data from the last step in the "middle" or "hidden" layers of the CNN 200 represent high-level features of the input image, and the Classifier Layers 231 and 235 utilize these detected features to classify the image based on the defined attribute(s) used to train the CNN 200. In one embodiment, the one or more Classifier Layers 231 and 235 include a softmax activation function. The result of this processing is an F-Score that quantifies the apparel item in the Image 205 according to the defined attributes. This F-Score can then be utilized to compare items, and determine apparel items that the selected item is objectively similar to (based on the attributes). Of course, although a particular CNN architecture is depicted, any neural network architecture or model can be used in various embodiments.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for automated fashion designing, comprising:
   training, by a computer device, computer models using deep learning based computer vision;
   identifying, by the computer device, at least one gap using cognitively determined fashionability scores (F-scores), wherein the at least one gap is identified based on: predicted sales of a designed fashion product, and interaction effects of the predicted sales on existing fashion products in a same subcategory; and within a particular F-Score range of the designed fashion product; and
   creating, by the computer device, a new fashion design using the computer models and the at least one identified gap.

2. The method of claim 1, wherein the training the models comprises training the models to perform image classification and object detection using neural network techniques and a corpus of images of existing fashion designs.

3. The method of claim 2, wherein the training the models comprises training the models to learn how different components of fashion designs are spatially related to one another.

4. The method of claim 1, wherein the F-scores are determined using cognitive analysis of publicly available fashion data associated with existing fashion designs.

5. The method of claim 4, wherein the at least one gap is identified based on price elasticity of fashion products in different F-score groups.

6. The method of claim 5, wherein the at least one gap is identified based on interaction effects and part partial correlations between all the different F-score groups.

7. The method of claim 1, wherein the creating the new fashion design comprises:
   determining plural components to be included in the new fashion design based on the at least one gap; and
   combining the plural components into a single design using the trained models.

8. The method of claim 1, further comprising:
   presenting the new fashion design to a user via a user interface;
   receiving user input from the user via the user interface; and
   revising, by the computer device, the new fashion design using the computer models and based on the user input.

9. The method of claim 8, wherein the user input comprises a selection of at least one component of the new fashion design that the user likes or a selection of at least one component of the new fashion design that the user dislikes.

10. The method of claim 1, further comprising:
    performing the identifying and the creating plural times to create plural new fashion designs;
    identifying, by the computer device, a subset of the plural new fashion designs; and
    creating, by the computer device, a common new fashion design using the computer models and based on the subset of the plural new fashion designs.

11. A computer program product for automated fashion designing, the computer program product comprising a non-transitory computer readable storage medium having program instructions embodied therewith, the program instructions executable by a computing device to cause the computing device to:

train computer models using deep learning based computer vision;

identify at least one gap using cognitively determined fashionability scores (F-scores), wherein the at least one gap is identified based on: predicted sales of a designed fashion product, and interaction effects of the predicted sales on existing fashion products in a same subcategory; and within a particular F-Score range of the designed fashion product; and create a new fashion design using the trained computer models and the at least one identified gap.

12. The computer program product of claim 11, wherein the training the models comprises:

training the models to perform image classification and object detection using neural network techniques and a corpus of images of existing fashion designs; and training the models to learn how different components of fashion designs are spatially related to one another.

13. The computer program product of claim 11, wherein:

the F-scores are determined using cognitive analysis of publicly available fashion data associated with existing fashion designs; and the group of components is determined using: price elasticity of fashion products in different F-score groups; and interaction effects and part partial correlations between products in the different F-score groups.

14. The computer program product of claim 11, wherein the program instructions cause the computing device to:

receive user input from a user viewing the new fashion design via a user interface;

determine a new group of components based on the group of components and the user input; and create a revised new fashion design using the trained computer models and based on the user input.

15. The computer program product of claim 14, wherein the user input comprises a selection of at least one component of the new fashion design that the user likes or a selection of at least one component of the new fashion design that the user dislikes.

16. The computer program product of claim 11, wherein the program instructions cause the computing device to:

perform the identifying and the creating plural times to create plural new fashion designs;

identify a subset of the plural new fashion designs; and create a common new fashion design using the computer models and based on the subset of the plural new fashion designs.

17. A system for automated fashion designing, comprising:

a processor, a computer readable memory, and a computer readable storage medium;

program instructions to train computer models using deep learning based computer vision;

program instructions to identify at least one gap using cognitively determined fashionability scores (F-scores), wherein the at least one gap is identified based on: predicted sales of a designed fashion product, and interaction effects of the predicted sales on existing fashion products in a same subcategory; and within a particular F-Score range of the designed fashion product; and program instructions to create a new fashion design using the trained computer models and the at least one identified gap.

18. The system of claim 17, wherein the program instructions further comprise program instructions to:

receive user input from a user viewing the new fashion design via a user interface;

determine a new group of components based on the group of components and the user input; and create a revised new fashion design using the trained computer models and the new group of components, wherein the user input comprises a selection of at least one component of the new fashion design that the user likes or a selection of at least one component of the new fashion design that the user dislikes.

19. The system of claim 17, wherein the program instructions further comprise program instructions to:

perform the identifying and the creating plural times to create plural new fashion designs;

identify a subset of the plural new fashion designs; and create a common new fashion design using the computer models and based on the subset of the plural new fashion designs.

* * * * *